(12) United States Patent
Noonan et al.

(10) Patent No.: US 12,742,683 B1
(45) Date of Patent: Sep. 22, 2026

(54) APPARATUS AND SYSTEM FOR MONITORING, TRACKING AND MANAGING SECURITY FOR BORDERS AND PERIMETERS

(71) Applicants: Mark Noonan, New Canaan, CT (US); Ali Raza, Franklin, WI (US)

(72) Inventors: Mark Noonan, New Canaan, CT (US); Ali Raza, Franklin, WI (US)

( * ) Notice: Subject to any disclaimer, the term of this patent is extended or adjusted under 35 U.S.C. 154(b) by 941 days.

(21) Appl. No.: 18/062,609

(22) Filed: Dec. 7, 2022

Related U.S. Application Data

(60) Provisional application No. 63/360,508, filed on Oct. 7, 2021.

(51) Int. Cl.
*G01J 5/00* (2022.01)
*G08B 13/19* (2006.01)

(52) U.S. Cl.
CPC ............ *G01J 5/0025* (2013.01); *G08B 13/19* (2013.01)

(58) Field of Classification Search
CPC ............................... G01J 5/0025; G08B 13/19
See application file for complete search history.

(56) References Cited

U.S. PATENT DOCUMENTS 9,711,018 B2 * 7/2017 Messiou .............. G08B 13/193
10,959,058 B1 * 3/2021 Stark ..................... H04W 4/029
2008/0106403 A1 * 5/2008 Voglewede ........ G08B 13/1663 342/350
2011/0030875 A1 * 2/2011 Conte ................. F16L 55/1652 138/104
2013/0106605 A1 * 5/2013 Mullins ................ G08B 27/003 340/541
2016/0080907 A1 * 3/2016 Saleem ................... H04L 67/12 455/456.1
2016/0270179 A1 * 9/2016 Ryhorchuk ............ H05B 47/19
2016/0300479 A1 * 10/2016 Modi ................... G08B 29/183
2017/0205289 A1 * 7/2017 Purohit ................ G06V 10/147
2022/0198896 A1 * 6/2022 Candy ................ G08B 13/1672
2024/0003746 A1 * 1/2024 Abousaleh ......... G01N 33/0027

* cited by examiner

*Primary Examiner* — John E Breene
*Assistant Examiner* — Manuel Salvador Castellon, Jr.
(74) *Attorney, Agent, or Firm* — Emanus, LLC; Willie Jacques

(57) ABSTRACT

A security system that can monitor activity along a perimeter, border, or other spaces comprising small form-factor packaging, battery-operated power, and low-cost sensor nodes. In an embodiment, sensor nodes are comprised of a microprocessor, PCB, and a plurality of sensors such as PIR, vibration, and accelerometers. The sensor nodes may be deployed by various vehicles and/or in various configurations, however, generally aerially and spaced in relative proximity to each other, respectively. In an exemplary mode, for borders (and larger perimeters), a secondary type of communications node may be used which would provide both longer distance communications (using secondary communications protocol), as well as greater processing power and memory storage, to augment the cumulative distributed capabilities of a mesh or grid system. This mesh system may be connected to a low-data central management system which may be managed only by smart devices such as mobile phones or laptops.

18 Claims, 15 Drawing Sheets

100
206
108
112
204
202
110
106
104

APPARATUS AND SYSTEM FOR MONITORING, TRACKING AND MANAGING SECURITY FOR BORDERS AND PERIMETERS

CROSS REFERENCE TO RELATED APPLICATIONS AND PUBLICATIONS

This application claims the priority benefit of provisional patent application Ser. No. 63/360,508, filed Oct. 7, 2021, by the present inventor, which is incorporated herein by reference in its entirety.

FIELD OF DISCLOSURE

The present disclosure relates to systems, apparatuses, and methods for assisting in the monitoring of spaces, perimeters, and borders (collectively "borders") while facilitating directing/direction of intruders and/or positioning/placement of other resources to precise locations where activity in monitored spaces is detected and/or anticipated to be. Such systems, apparatuses, and methods, of the present disclosure relate primarily to the monitoring of borders and/or other commercial applications, separate from border/perimeter management, as recognized by those persons of skill in the art.

BACKGROUND

The subject matter discussed in this background section should not be assumed to be prior art merely as a result of its mention herein. Similarly, any problems mentioned in this background section or associated with the subject matter of this background section should not be assumed to have been previously recognized in the prior art.

Cases related to invasions in territory, buildings etc. have increased over the years very rapidly in both frequency, location, and deception amongst other parameters. Moreover, a substantial number of these cases are related to terrorist activities, burglary, abduction, etc. These cases result in loss of both life and money and raises concerns over the security of a physical spaces, including enclosed spaces. The prior art discloses many systems and techniques that are used as a defense against these kind of invasions such as deployment of personnel, physical and electronic surveillance/security measures, etc. Amongst these measures, the deployment of security personnel is the most traditional and common technique to maintain security within a space. However, there is a huge margin of/for error and other shortcomings in these types of techniques. More particularly, it is difficult for current systems and/or individuals to maintain high security under adverse conditions such as darkness, harsh weather, etc.

Furthermore, in a preponderance of the prior art, monitoring cameras are used for surveillance and they are typically the primary tool used to monitor population movement. In common usage, monitoring cameras (including high resolution infrared) are used as a front-end tool to prevent crime and terrorist activities. These cameras are specifically designed to track movement of any moving body and can be monitored, generally remotely, using an output video screen. Although, such monitoring cameras are capable of tracking the movement of an intruder, they are easily compromised in that cameras may be easily visible to intruders, despite being camouflaged or positioned at multiple locations. As such, cameras are an easy target for the intruders and therefore easily destroyed and/or neutralized.

Even further, a number of systems and devices of the prior art disclose means that are primarily focused on incursions or intruders, and exist to monitor, track, and provide information or alerts about border or perimeter activity, though less so for military than non-military uses. Prior art systems and devices such as that disclosed by Dwaine Parker et. al. in U.S. Pat. No. 10,907,940 includes unmanned systems using various detection elements in addition to employing machine learning and data mining techniques. However, such systems can also be neutralized after being detected by capturing technologies such as radar. In addition, the enablement of these systems, as disclosed, are entirely based on the provisioning of larger centralized sensor systems.

Such systems and devices of the prior art are generally configured to gather huge amounts of sensor data from portable and fixed towers, images from drones, satellites' information, etc., and other intelligence data/information by employing high computing power data/communications centers. Moreover, these systems have a heavy reliance on human resources used to study and draw conclusions about the monitored environment from the gathered data. Because of high-power consumption and human resource requirements, much of the resulting intelligence conclusions are not deliverable in real-time or without significant latency.

In other prior art, the use of physical walls, sensor towers, drones, cameras, and other technologies rely on line-of-sight, imperfect sensor detection, huge expense deployments, etc., such as that disclosed by Negar et. al. in US20210312777A1. These prior art systems use heavy deployment of complex sensing infrastructures, including vision-based (e.g., cameras) and environmental motion-based (e.g., light, proximity, and heat sensors) systems, which continuously observe changes relating to or arising from the surrounding environment and detect abnormal events and activities. However, such sensor-based approaches are burdensome requiring excessive deployment and exact heavy device/labor expenses for their users. They also require significant installation time and cost, are not viable in many terrains/landscapes, cannot be deployed rapidly or clandestinely, and demand constant maintenance and control services. Furthermore, such prior art systems/designs only monitor a small fraction of a border at any one time and are vulnerable as, for example, even thermal signatures of such designs can be degraded (i.e., compromised, attacked, etc.) using low-cost techniques. Equally as important, the majority of prior art systems are impaired by adverse weather conditions (e.g., rain, fog, snow, dust storms, etc.) and even more so by dense vegetation.

Prior art systems such as those disclosed in US20210070441A1, RU2769808C1, and IN202041014400A, and non-patent literature references, including "An Efficient WSN Based Solution for Border Surveillance" authored by Mohamed et. al. and "Generalized Intrusion Detection Mechanism for Empowered Intruders in Wireless Sensor Networks" authored by Wang, et. al. has various deficiencies including the need for on the ground vehicles, combining multimedia sensors, scalar sensors like unattended ground sensors (UGSs), and the need for large, complex communications centers needing huge amounts of data and power to operate.

The prior art's reliance on gathering and processing heavy data/information, including high-resolution images that require powerful computer processing resources, and on significant numbers of individual assets for operating/monitoring hardware is costly and power intensive. Furthermore, interdictions are often more dangerous as the prior art's associated latency in processing and analyzing the large volumes of data make it more difficult and time consuming to determine precise real-time location and populations related to incursions.

It is therefore an object of the present invention to provide a system and an apparatus for monitoring, tracking, and managing a secure perimeter in border areas. Specifically, it is an object of the present disclosure, to provide a virtual border security in the form of a sensor field system that can replace, or be complimentary to, physical walls (particularly in areas where there is higher traffic or activity), and that can outperform other prior art technologies being employed. It is a further object of the present invention that embodiments and aspects of the present disclosure can be deployed at significantly lower cost (as compared to the prior art), while also being more difficult to defeat or circumvent than the other prior art designs and/or technologies.

SUMMARY OF INVENTION

The following discussion provides a summary of embodiments of the present invention, though it is not a comprehensive disclosure of all of the systems' features and capabilities. The present invention, as discussed, primarily focuses on aspects of the various embodiments as they relate broadly to border and perimeter security. Those persons of skill in the art will recognize that there are many other uses and applications of the embodiments presented, some examples of which will be described on below.

An apparatus for identifying and tracking intruders over, through, pass, etc. a secure perimeter, region, zone or space is disclosed herein. The apparatus generally comprises a plurality of nodes, however, may be comprised of, and function as, a single node arranged in a suitable configuration. Sensor data and/or field analysis information collected by the nodes or deployed system may be communicated in several ways: 1) direct to operators in the field via apps, or 2) through visual or audio signal from local nodes, or 3) via uplink to control/communications center then via SMS or other messaging through phones, devices or companion apps on local devices of operators via handheld device or devices installed in vehicles.

In various embodiments, the apparatus or system may be comprised of communication nodes and/or sensor nodes. The communication nodes are configured to generally collect data and communications (e.g., messages) to/from sensor nodes. It is an object of the present invention that communication nodes are configured to collect data and communications in a more efficient manner rather than having such data and messages in the mesh communications flow being handed/transferred from node to node, and particularly in order to traverse said data and communications over long distances.

It is a further object of the present invention to conserve power usage. In an aspect, communications and data flow across a mesh could entail using many times (e.g., even thousands more) sensor nodes to relay messages across certain distances. Said use of sensor nodes, themselves having a small and finite battery capacity, would as compared to the use of communications nodes, involve the use of significantly more power in aggregate and thereby, for instance, shorten the grid's useful life. On the other hand, the higher-powered communication node processors are enabled to communicate large volumes of data more rapidly, including certain broad communications such as firmware updates or broad parameter settings for sensor node status instructions, etc. Furthermore, communications nodes may be configured to communicate with many nodes simultaneously in a substantially more efficient manner.

Even further, the communication nodes' higher powered processors can enable significantly greatly field analysis capabilities to assess the probability and nature of threats without requiring a conventional communications center capabilities. In this respect, the use of communication nodes reduces reliance on communications lines or other network connection methods to transfer data and communications to data centers, thereby enabling more rapid and real time assessment and instructions to operators managing incursions in the grid.

Yet further, in applications requiring clandestine operations, uplink communications to data centers may be visible to adversaries, potentially providing intelligence information to said adversaries regarding active operations. In an exemplary aspect, uplinks are easier to jam and/or disrupt versus using short range BLE communications directly to operators or agents in the grid. Those of skill in the art recognize that low energy/short distance communications are significantly more difficult to detect, especially given that such communications may be routed around or away from potential threats or adversaries. It is therefore an object of the present invention to provide the aforementioned two-tiered system (i.e., sensor nodes and communications nodes) as a more effective and efficient scheme for operation of larger grid applications.

To address the aforementioned objective, a system for identifying intruders over a secure perimeter is disclosed. The system comprises an apparatus comprising one or more nodes consisting of one or more sensor nodes, or said one or more sensor nodes coupled with one or more communications nodes, arranged in a suitable configuration. Further, the apparatus comprises one or more sensor nodes, said nodes consisting of a processor and a plurality of sensors including, at least, a sensor to detect vibrations and a faceted passive infrared (PIR) sensor lens configured on a dome-shaped portion to gather and direct light reaching said dome-shaped portion to the PIR sensor. Also, the apparatus comprises one or more communications nodes consisting of a processor; wherein the sensor nodes. The one or more communication nodes includes a generally flat portion incorporating a coin cell and a circuitry arrangement, and a second portion comprising a dome configured on and sealed along a periphery of the flat portion to prevent humidity from penetrating inside the circuitry arrangement.

Furthermore, in an aspect, a metal tab is connected to the circuitry arrangement. In another aspect, the metal tab encloses the circuitry arrangement and extends outside the sealed periphery of each node of the plurality of nodes. In a further aspect, an antenna wire is attached to the metal tab and connected to the circuitry arrangement, wherein the antenna wire is powered by the coin cell.

Further, the system comprises a data center communicatively linked to the communication nodes of the apparatus via a network interface to receive data from the nodes. Further, the system comprises a processing module linked to the data center, configured to process and generate one or more results from the received data using an artificial intelligence and machine learning (AI/ML) module. Also, the system comprises one or more computing devices communicatively linked to the data center via the network interface. The one or more computing devices receives one or more notifications based on the one or more results related to intruders detected by the sensor nodes.

Furthermore, in an aspect, the system comprises the data center communicatively linked to the plurality of nodes of the apparatus via the network interface, such as a subset of nodes or other uplink, configured to receive data from the one or more nodes directly. Such uplink nodes are also configured to process the received data (within the grid) using data from local sensor nodes or indirectly from the plurality of nodes using the AI/ML module. The one or more computing devices receives one or more notifications based on the one or more results related to intruders detected by a subset or plurality of nodes.

In an embodiment, an apparatus for identifying and tracking intruders over, though, pass, etc. a secure perimeter, region, zone or space is disclosed herein. The apparatus comprises one or more nodes consisting of one or more sensor nodes, or said one or more sensor nodes coupled with one or more communications nodes, arranged in a suitable configuration. Further, the apparatus comprises one or more sensor nodes, said nodes consisting of a processor and a plurality of sensors including, at least, a sensor to detect vibrations and a faceted passive infrared (PIR) sensor lens configured on a dome-shaped portion to gather and direct light reaching said dome-shaped portion to the PIR sensor. The one or more sensor nodes includes BLE or other similar low power processor. The sensor nodes are configured to collect data, perform preliminary analysis of said data, and communicate the data and preliminary analysis to communication nodes. Also, the apparatus comprises one or more communications nodes consisting of a processor; wherein the sensor nodes. The one or more communication nodes includes a generally flat portion incorporating a coin cell and a circuitry arrangement, and a second portion comprising a dome configured on and sealed along a periphery of the flat portion to prevent humidity from penetrating inside the circuitry arrangement.

In one exemplary embodiment, the node is configured for aerial deployment, including being light in weight, impact resistant, and having a diameter in the range of 1-2".

In another exemplary embodiment, the apparatus comprises substantially fewer communication nodes than sensor nodes. The apparatus is configured with one or more sensor nodes and one or more low-power, short-range communication nodes.

In one exemplary embodiment, the one or more communication nodes are configured with short-range communications, including BLE, for communicating with sensor nodes, and long-range, higher powered processors and communications, including LoRa, Zigby, WiFi, and Cellular, for communicating with sensors and providing greater and more complex analysis, computing capacity, data storage and transfer speeds. The communication nodes include higher level processors configured to efficiently gather, analyze and relay more data over longer distances.

In another exemplary embodiment, the sensor nodes are configured to, when on the ground and facing up, to reliably detect human shadow and vibration.

In an aspect, the one or more nodes include a wire antenna tail configured for deforming and absorbing impact energy and for increasing the probability of said nodes coming to rest flat side down when said nodes contact a ground or other surface after being dropped. The sensor nodes are configured for increased efficiency by using low-power, low-bandwidth, and minimal data, short-range sensors and binary sensor data fitting a time series of an incursion path.

In an exemplary embodiment, the one or more nodes are configured with one or more light emitting diodes (e.g., LEDs) and a buzzer for providing notification of intrusions. The nodes are configured to provide, individually or collectively using sequences and patterns across said nodes, visual and audio navigation of a path by using the one or more LEDs and the one or more buzzers; and wherein said nodes are configured to indicate directions and paths of intruders while providing visual and audio target location clues without the need for separate device.

In an aspect, the apparatus is configured to provide texting communications (e.g., text messages, images, notifications, alerts, reminders and updates), between operators using smart devices (e.g., smartphones, tablets, and other mobile devices) connected to a grid, using only sensor nodes and/or communications nodes as a means for relaying communications between said smart devices.

In another aspect, the nodes, initially mapped with global positioning system (GPS) coordinates, is permanently configured with said GPS coordinates to provide accurate navigation of the plurality of nodes without future need or reliance on GPS system. The one or more nodes is configured to provide real time targeting and targeting updates for navigating weapons and plotting target interception, location, and path. The nodes are configured to remain in sleep mode for a vast majority of the time. The nodes are constructed with a D-shaped case configured to aid the nodes in landing and remaining in an upright position.

In an aspect, the apparatus generally comprises a plurality of nodes, however, may be comprised of, and function as, a single node arranged in a specific configuration along the secure perimeter. Sensor data and/or field analysis information collected by the nodes or deployed system may be communicated in several ways: 1) direct to operators in the field via apps, or 2) through visual or audio signal from local nodes, or 3) via uplink to control/communications center then via SMS or other messaging through phones, devices or companion apps on local devices of operators via handheld device or devices installed in vehicles.

In an aspect, the generally flat portion corresponds to a first portion. Also, the curved portion corresponds to the second portion and is integrated with a faceted passive infrared (PIR) sensor to monitor the curved portion of each of the plurality of nodes. The PIR sensor encompasses at least 150 degrees to 180 degrees over the curved portion of each of the plurality of nodes. Further each of the passive infrared (PIR) sensor is tuned for distance of approximately 10 feet and larger distance motions. The circuitry arrangement of each of the nodes within the plurality of nodes is configured to receive and process data in a more or less sequential manner from node to node, therein following an intrusion path, where the intruder triggers added nodes.

In one embodiment, a metal tab is connected to the circuitry arrangement which consists of PCB with microprocessor, sensors (e.g., infrared, vibration/accelerometer, etc.), LEDs, buzzer, power management components and battery. The metal tab encloses the circuitry arrangement and extends outside the sealed periphery of each node of the plurality of nodes. In other embodiments, an antenna wire is attached to the metal tab and connected to the circuitry arrangement. The antenna wire, in various embodiments, is powered by a coin cell. In yet a further embodiment, the plurality of nodes is attached to weight to allow the plurality of nodes to float or to be positioned at various depths, including the body, of a body of water. In one embodiment, each node of the plurality of nodes is configured to automatically come to rest on a flat portion of the node when a node is scattered or dropped, as the center of mass of the plurality of nodes is centered closer to the flat portion of the node.

In another exemplary embodiment, each node of the plurality of nodes is fashioned with a roughly circular footprint of approximately 1.5-inch diameter. In an aspect, the flat portion and the curved portion of nodes are constructed, generally, in two halves using injection molding techniques and then joined together, such as by using a live hinge. Further, the flat portion and the curved portions of the nodes are sealed to prevent the penetration of humidity, dust etc. or other foreign matter. In a further embodiment, nodes comprising the plurality of nodes are camouflage colored/configured such as in the form of rock proximate a perimeter location. In an even further embodiment, one or more light emitting diodes (LEDs) and/or buzzers are integrated on a/any node comprising the plurality of nodes.

In another exemplary embodiment, a node is configured to include a D-shaped (i.e., "dome-shaped") case configuration (i.e., a cross-sectional shape generally resembling half of a sphere) which is structured to come to rest when scattered randomly to mostly stay in an upright position with the flat side down when contacting/resting on a surface.

In a further embodiment, a distal end or ends of the antenna wire is formed into a U shape to provide frictional contact points to the plurality of nodes and absorb external impact forces to prevent damaging a node. In yet a further aspect, the plurality of nodes slides along the antenna wire to absorb impact energy whereby the antenna wire is configured to bend, in the case of dropping over a ground surface, to absorb impact forces exerted over the plurality of nodes.

In an embodiment, the plurality of nodes deployed over an area provides navigational points to a user to enable accurate navigation. The plurality of nodes is configured to navigate weapons in order to provide real time targeting updates and/or plotting a target interception, location and path. In one embodiment, the plurality of nodes is configured to stay in a sleep mode for maximum prescribed time duration in order to decrease idle battery power drain.

In another embodiment, the apparatus is configured to assess and analyse data in real time and to provide actionable intelligence to users of the systems, devices, and components, individually or collectively, for further inspection, tracking or interdiction as dictated by, at least, the data and information gathered. In one embodiment, the data may relate to the sensor signal data that is generated by the plurality of nodes, upon detecting an intruder in proximity to the node. Simultaneously, data might be shared to a communications and data center, itself having greater processing power, to also look for potential incursion paths, and path predictions. In an exemplary embodiment, the system collectively, gathers, saves, tracks, and manages data and data transfers (and other information and messages) related to monitoring spaces, perimeters, and borders (collectively also referred to as "borders" or "perimeters"). Further, the exemplary system then uses specific algorithms, calculations, etc., including means for discerning/identifying past patterns and data collected to also provide a range of alerts and, using system components, provide navigational guidance/instruction to responders via visual signals (e.g., LEDs, CFL bulbs, etc.) or sounds (e.g., buzzers, bells, chimes, etc.).

In an embodiment, a method of securing a perimeter, including deploying, mapping, and extracting data from a plurality of nodes, is disclosed. The method comprises steps of determining a real-time location of a deployment vehicle and sending to and storing thereon the real-time location to the plurality of nodes. Further, the method comprises updating and replacing the real-time location with an updated real-time location thereon the plurality of nodes. Even further, the method comprises deploying one or more nodes, consisting of one or more sensor nodes, or said one or more sensor nodes coupled with one or more communications nodes, over an assigned location using the deployment vehicle. Successively, the method comprises ceasing updating of real-time location during the deployment of the plurality of nodes. Yet further, the method comprises collecting the deployment order and sequence data of the nodes within the plurality of nodes. Further, comparing the assigned location with the updated real-time location for each of the plurality of nodes to validate location, deployment order and sequence data of the plurality of nodes and mapping each of the plurality of nodes with a real world map(s).

Successively, the method comprises fetching a real-time location of the plurality of nodes and transmitting the fetched location to a data center. Further, the method comprises creating a map of the plurality of nodes with their original locations and dividing the map into a grid assigned with the real-time location of the plurality of nodes. Successively, establishing grid coordinates by receiving signals broadcasted from the one or more communication nodes. In one aspect, the method comprises i) establishing the location of the one or more communication nodes, thereon configured with GPS chips and/or already mapped with GPS coordinates, ii) establishing mid-points between such mapped nodes to estimate the GPS coordinates of unmapped, and generally non-communication nodes, iii) assigning that estimated or calculated GPS location for any node or nodes at or near that mid-point, and iv) continuing the process iteratively until all nodes are assigned a calculated or approximate GPS position.

Successively, the method comprises fetching sensor data, including passive infrared and vibration data, corresponding to an intruder. Further, identifying sensor data, including passive infrared and vibration data, associated with the intruder. Further, the method comprises generating an interdict signal based on the identification of the spectral signatures associated with the intruder. At last, reporting the interdict transmission signal via the data center to control or disrupt the intruder near, at, or through a perimeter.

BRIEF DESCRIPTION OF THE DRAWINGS

The accompanying drawings illustrate various embodiments of systems, methods, and embodiments of various aspects of the disclosure. Any person of ordinary skill in the art will appreciate that the illustrated element boundaries (e.g., boxes, groups of boxes, or other shapes) in the figures represent one example of the various boundaries representative of the disclosed invention. It may be that in some examples one element may be designed as multiple elements or that multiple elements may be designed as one element. In other examples, an element shown as an internal component of one element may be implemented as an external component in another and vice versa. Furthermore, elements may not be drawn to scale. Non-limiting and non-exhaustive descriptions of the present disclosure are described with reference to the following drawings. The components in the figures are not necessarily to scale, emphasis instead being placed upon the illustrated principles.

Various embodiments will hereinafter be described in accordance with the appended drawings, which are provided to illustrate and not to limit the scope of the disclosure in any manner, wherein similar designations denote similar elements, and in which.

DETAILED DESCRIPTION

Reference will now be made in detail to specific embodiments or features, examples of which are illustrated in the accompanying drawings. Wherever possible, corresponding or similar reference numbers will be used throughout the detailed description and drawings to refer to the same or corresponding parts. Moreover, references to various elements described herein, are made collectively or individually when there may be more than one element of the same type. However, such references are merely exemplary in nature. It is noted that any reference to elements in the singular may also be construed to relate to the plural and vice-versa without limiting the scope of the disclosure to the exact number or type of such elements unless set forth explicitly in the appended claims.

Some embodiments of this disclosure, illustrating all its features, and equivalents thereof, will now be discussed in detail. The words "comprising," "having," "containing," and "including," and other forms thereof, are intended to be equivalent in meaning and be open-ended in that an item or items following any one of these words is not meant to be an exhaustive listing of such item or items or meant to be limited to only the listed item or items.

It must also be noted that as used herein and in the appended claims, the singular forms "a," "an," and "the" include plural references unless the context dictates otherwise. Although any systems and methods similar or equivalent to those described herein may be used in the practice or testing of embodiments of the present disclosure, the preferred systems, and methods are now described.

Embodiments of the present disclosure will be described more fully hereinafter with reference to the accompanying drawings in which like numerals represent like elements throughout the several figures, and in which example embodiments are shown. Embodiments of the present disclosure may, however, be embodied in alternative forms and should not be construed as being limited to the embodiments set forth herein. The examples set forth herein are non-limiting examples and are merely examples among other possible examples.

Figure 1A:
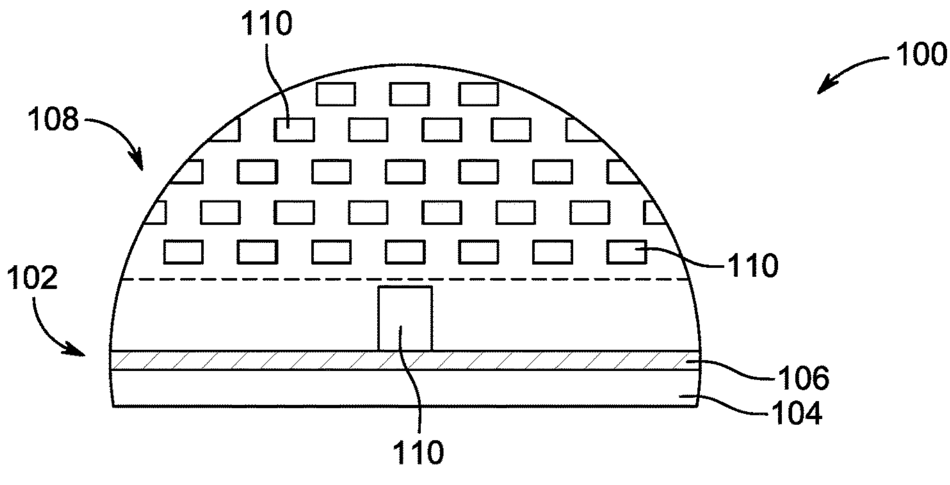
FIG. 1A shows a side view of a node, in accordance with an embodiment of the present invention.
Figure 1B:
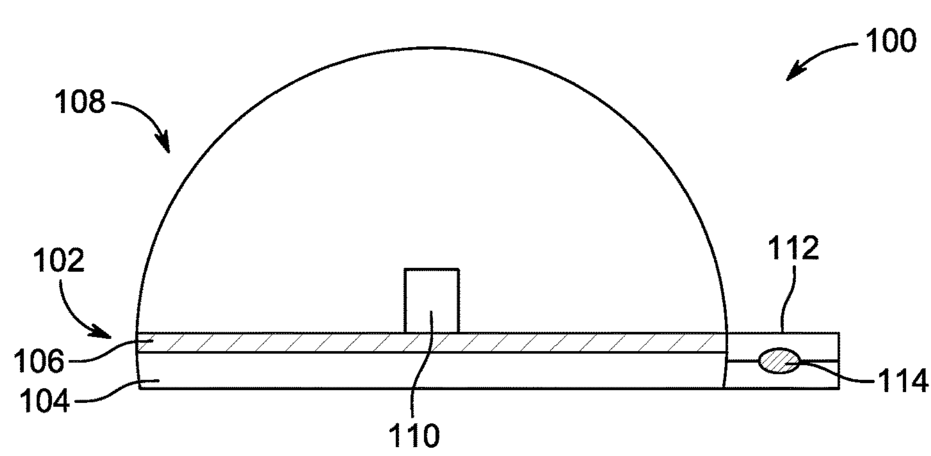
FIG. 1B shows another side view of the node with a metal tab, in accordance with an embodiment of the present invention.

FIGS. 1A-1B show a side view of a node 100, in accordance with an embodiment of the present invention.

The node 100 may be comprised of a flat portion 102, low-power means, configured, in an embodiment, as a coin cell 104, a circuitry arrangement 106, a curved portion 108, a faceted passive infrared (PIR) sensor 110, a metal tab 112 and an antenna wire 114. The flat portion 102 may correspond to a first portion and the curved portion 108 may correspond to a second portion. Hereinafter, the faceted PIR sensor 110 may be referred as a PIR sensor 110. In one embodiment, the node 100 may be constructed as a single clamshell injection molded plastic part in a material conducive to infrared light transmission (e.g., polyethylene etc.). Further, node 100 may be assembled by a thin membrane, or a live hinge to enable simpler assembly of the node 100. Further, the node 100 may be structured in a roughly circular footprint to camouflage or resemble a naturally occurring element such as a rock. In another embodiment, the node 100 may be constructed in two halves with the flat portion 102 as one half and the curved portion 108 as other half. In one exemplary embodiment, the node 100 is constructed with an approximate size of 1.5" diameter, and with a D-Shaped cross-section.

In one embodiment, a plurality of nodes may be arranged in series or parallel (or other predetermined pattern) to cover a specific area or a boundary or a border. It may be noted that, the plurality of nodes may be deployed in a random or scattered pattern on a surface aerially via drones (or other craft, vehicle or even manually in the case of use in small applications) from, in an aspect, cartridges of various designs. These cartridges would house a larger number of nodes, where the cartridge could be readily removably attached to a drone, plane or other vehicle configured to distribute the plurality of nodes in various densities and deployment speeds. The cartridge(s) might be connected via wire or wirelessly to the vehicle, though in an exemplary embodiment the cartridge(s) may be connected, at least, with an electrical power connection configured to operate the cartridge for "trigger" release of one or more nodes at determined intervals and spacing. The plurality of nodes may be deployed uniformly within a local area but not necessarily in the same densities in all areas.

In one embodiment, the cross-sectional shape of the node 100 may have a D-shape configuration. The node 100 may be comprised of the flat portion 102, wherein the flat portion 102 may act as a base for the node 100 when deployed over a ground surface. In one embodiment, the flat portion 102 may be incorporated with the coin cell 104. The coin cell 104 may be linked with the circuitry arrangement 106 to provide electrical energy. Further, the nodes 100, may be configured to gather and process data in a sequential manner along an incursion path to assess sensor data to identify sequential sensor triggers within the grid or mesh that might fit a path or time series of an incursion. The data may relate to a sensor signal data that is generated upon detecting an intruder in proximity to the node 100.

Further, the curved portion 108 may be/is integrated with the PIR sensor 110 which is configured to provide monitoring capability to the curved portion 108 of the node 100. In an exemplary embodiment, the PIR sensor 110 may be configured to detect infrared radiations emitted from an object. In one embodiment, the curved portion 108 of the node 100 may be fabricated in a manner such that the PIR sensor 110 may encompass a majority of the surface of the curved portion 108 in order to provide a wide and/or wider range of view. For example, in an aspect, the PIR sensor 110 has a viewing angle of over 150 degrees, and optimally closer to 180 degrees. In another aspect, the curved portion 108 may be sealed along the periphery of the flat portion 102 to prevent penetration of humidity inside the circuitry arrangement 106.

In an embodiment, the curved portion 108 of the node 100 may be configured to stay in a completely upright or partially upright position when deployed on ground, floor, etc. surface, such that the PIR sensor 110 is configured to stay on the upper side of the node 100 as shown in FIGS. 1A and 1B. Further, a battery (not shown) and a printed circuit board (PCB) (now shown) may be located underneath the node 100 and integrated on the flat portion 102 to optimally shift the center of mass (COM) of the node 100 closer to the flat portion 102. In an exemplary aspect, the battery may comprise more of the weight of the node and as such cause the COM to be shifted generally closer to the battery. For optimal performance, the PIR sensor 110 may be located near the middle of the PCB and node 100, approximately equidistant from the PIR sensor 110. In one embodiment, the node 100 and PCB may be fabricated in a round shape to function effectively.

In one embodiment, the deployment of the plurality of nodes in closer proximity to each other provides overlapping sensor range to the PIR sensor 110 and further provides sensor range capabilities even in rain, dust storms, fog, dense vegetation, and/or other adverse environmental conditions to detect the presence of an object given a higher signal to noise ratio of the PIR sensor 110. In an exemplary embodiment, the plurality of nodes is deployed roughly two meters apart and allows triggering of, for example, at least 20 PIR sensors to detect human or other activity. In a further embodiment, shorter range (several feet) and larger motion (10 feet+/−) oriented PIR sensor 110 may be designed for specific ranges and scales of motion.

In a further embodiment, the PIR sensor 110 includes a wide field of vision. In an aspect, the sensors field of vision has a limit of 180 degrees. In an aspect, if the PIR sensor 110 lands or is positioned with the flat portion 102 over the ground or other surface, a wider field of vision may not necessarily enhance the performance of the PIR sensor 110. The range of the PIR sensor 110 may overlap with that of other PIRs (and other sensors) and provide redundant coverage for all points on a grid where one or a multiple of nodes detect the same incursion simultaneously. In an exemplary aspect, a node may comprise multiple sensor types, for example, including an accelerometer (with generally much shorter detection range for humans versus using PIR sensors), a single sensor might detect both PIR and vibration/accelerometer sensor or triggers (i.e., "vibration" or "vibration sensors" covers a range of sense types, including accelerometers that are generally used to identify minute vibrations or motion, from human activity or otherwise), providing further redundancies that can be useful in certain weather conditions etc., In another case, if the PIR sensor 110 comes to rest on the curved portion 108, some portion of the PIR sensor 110 may be facing the ground, and that portion may only be effective to provide detection in one direction.

In yet another embodiment, when deployed, the node 100 may come to rest tipped to one side; however, the PIR sensor 110 is still capable of functioning, even if only partially, and more so if the field of view is closer to 180 degrees in all directions. In such cases, the PIR sensor 110 capability may be functionally reduced though more so in one particular direction (e.g., facing north or any other direction). For example, if a node were mostly facing north, as described, and an intruder was approaching from the south, the intruder would still be detected by the PIR sensor, as the intruder walked past or otherwise breached such node. In another embodiment, the node 100 may land on the flat portion 102, wherein the PIR sensors would operate in all directions. In an aspect, it is an object of the present invention that the D-shape of the node 100 allows the node to disproportionately (i.e., more often than not) land facing upwards, or with a significant portion of the PIR sensor 110 facing outwards and upwards, such that some portions of the PIR sensor 110 is directed outwards.

In an alternative embodiment, an accelerometer (not shown), enabled by firmware code, configured to be tuned for greater sensitivity for human activity and ground conditions and frequencies or a vibration sensor (not shown) may also be incorporated on the node PCB The accelerometer and/or the vibration sensor may be configured to provide target acquisition reliably when deployed in very dense grids or environments, wherein the plurality of nodes is placed under 10 feet apart or even under 6 feet, to achieve ideally approximately 3 feet between them, where the sensor reach is only required to be half the spacing in order to ensure all points on the grid can detect footsteps, PIR signatures etc.

Further, the node 100 may be integrated with the metal tab 112 (as shown in FIG. 1B) connected to the circuitry arrangement 106. In an embodiment, the metal tab 112 may be configured to enclose the circuitry arrangement 106 and extend outside the periphery of the node 100. Further, the antenna wire 114 may be attached to the metal tab 112 and connected to the circuitry arrangement 106. The antenna wire 114 may be configured to allow the range of the vibration sensor to be extended and its efficacy improved. In another exemplary aspect, if the node 100 is buried in deep snow or sand, for example, the antenna wire 114 would be more likely to be impacted by footstep compression of the snow, sand, etc. in order to detect activity. In its simplest function, the antennae wire functions as a simple trip wire making it significantly harder for an intruder to navigate a densely packed grid without touching a node or antennae wire.

Figure 1C:
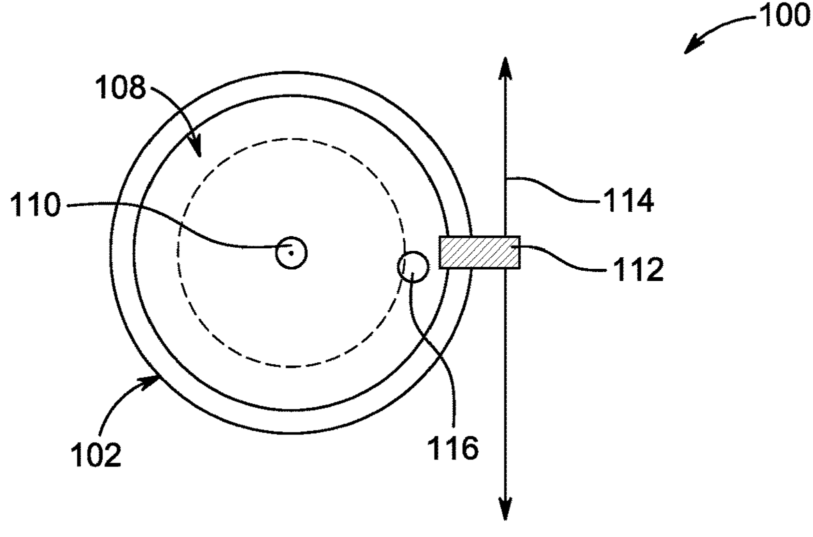
FIG. 1C shows a top view of the node, in accordance with an embodiment of the present invention.

FIG. 1C shows a top view of the node 100, according to an embodiment. The node 100 may comprise an accelerometer 116 disposed behind the metal tab 112. The accelerometer 116 is configured to determine physical movement of the node 100. In one embodiment, the metal tab 112 may be configured to better transfer vibrations or motion detected by the accelerometer 116 to better optimize its sensitivity. Further, the metal tab 112 may be constructed of metal or PCB material. In addition, the metal tab 112 may be configured to extend from the node 100, such that when the node 100 is snapped closed, the antenna wire 114 may be held against the PCB, and the vibrations from the antenna wire 114 may transmit more directly to the PCB and the accelerometer 116. Such antenna might also serve or function as a "tail", and creating wind drag on such tail to assist in orienting the node during flight if deposited aerially.

In accordance with an embodiment of the present disclosure, the antenna wire 114 is configured to enable loading a drone or other vehicle with nodes more efficiently and, and to more reliably and accurately release of the plurality of nodes from the cartridge (or bracket). Further, the antenna wire 114 aids in aligning the plurality of nodes during deployment and also helps to mitigate impact forces to the nodes from the ground. The antenna wire is shaped or otherwise configured to provide an impact cushion or crumple zone to absorb impact energy. In an exemplary embodiment, the antenna wire 114 is constructed from cobalt or nickel or similar magnetic material for providing means to gather or collect the plurality of nodes using magnets (e.g., electromagnets). In a further embodiment, the antenna wire 114 is configured to increase the probability of landing the plurality of nodes on the flat portion 102 when deposited or scattered on a ground or other surface. According to an embodiment of the present disclosure, the antenna wire 114 is configured to add weight to nodes of the plurality of nodes and thereby enable the shifting of the center of mass of the node 100 towards the flat portion 102.

In yet another embodiment, the antenna wire 114 may be attached to one edge or side of the flat portion 102 of the node 100 to assist even when any of the nodes of the plurality of nodes does not land on the flat portion 102 thereby increasing the likelihood of the node 100 to be positioned in a tilted orientation. The tilted orientation of the node 100, even in this position, allows the PIR sensor 110 to have greater range or field of vision.

In an alternative embodiment, a tip sensor (not shown) and a compass sensor (not shown) may be integrated into a node of the plurality of nodes to provide information that determines the placement position of the node 100. This information of the orientation of a node of the plurality of nodes helps in assessing the direction of the PIR sensor 110. Further, a microphone (not shown) and an event camera (not shown) may be installed on or within the node 100. In an aspect, nodes in close proximity or density are configured to combine sensor data from multiple PIR sensor 110 to reconstruct a fuller image or audio of the object detected in proximity to a node of the plurality of nodes. In yet another alternative embodiment, a chemical sensor, a biological sensor or a radiation detection sensor may also be integrated within the node 100.

In an embodiment, the plurality of nodes may be configured in a manner to cover or layer an existing grid (i.e., an existing plurality of nodes) with a newer model node. Such nodes may be deployed or otherwise installed in the field using drones, etc., without the assistance of humans typically needed in field installations. In an exemplary aspect, densities of the plurality of nodes may be increased in certain areas to adapt to higher traffic patterns in such areas or regions. Further, as shown in FIGS. 1B and 1C, the attachment point for the antenna wire 114 may be closer to the flat portion 102 of the node 100

In an exemplary embodiment of the present disclosure, the node 100 when assembled may form a weather-tight seal (not shown) around an outer edge, where only the tab of the PCB may be extending outside the weather-tight seal of the node 100. Such assembly of the node 100 ensures that when the plurality of nodes is deployed, under any external impact, the node 100 may not impact the integrity of the weather-tight seal. It may be noted that the antenna wire 114 may have significant mass relative to the curved portion 108 of the node 100. Therefore, the impact of the center of mass, moment of inertia, as well as changing the effective shape of the apparatus together may increase the chances of allowing the node 100 to rest flat towards the flat portion 102 or position in a manner to reveal a significant portion of the PIR sensor 110 to allow detection of or other PIR signatures nearby as shown in FIGS. 2A and 3B.

Figure 1D:
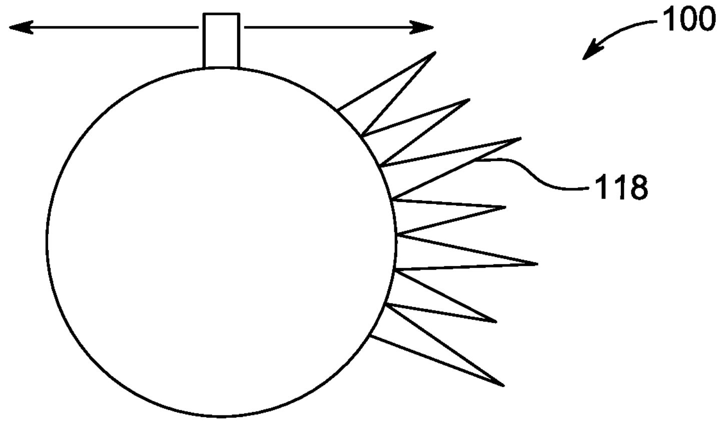
FIG. 1D shows a top view of the node attached with one or more prongs, in accordance with an embodiment of the present invention.

FIG. 1D shows a top view of the node 100 attached with one or more prongs 118, according to an embodiment. The one or more prongs 118 may be moulded along the node 100 as part of an upper or a lower case. It is contemplated that no additional manufactured part may be required to arrange the one or more prongs 118 over the node 100. In an embodiment, the one or more prongs 118 acts as a crumple zone for the node 100. The one or more prongs 118 are protrusions that impact the ground first when deployed such that the one or more prongs 118 bend, flex or break when impacting the ground in order to slow deceleration and lessen impact forces with the ground or other surface to reduce potential damage at impact to the node 100. In another embodiment, prongs are deployed on all sides of the node 100. It may be noted that the node 100 if used in conjunction with the antenna wire 114 or "tail", may assist in orienting the node 100 during decent from a deployment vehicle. In an exemplary aspect, similarly to a badminton birdie or dart falling heavy end first, the tail has more drag per weight that allows the node to be oriented tip down toward the node crumple zone, wherein the antenna wire/tail extends in front of the node and is used as the crumple zone, and further allows the node to slide along the wire.

Figure 2A:
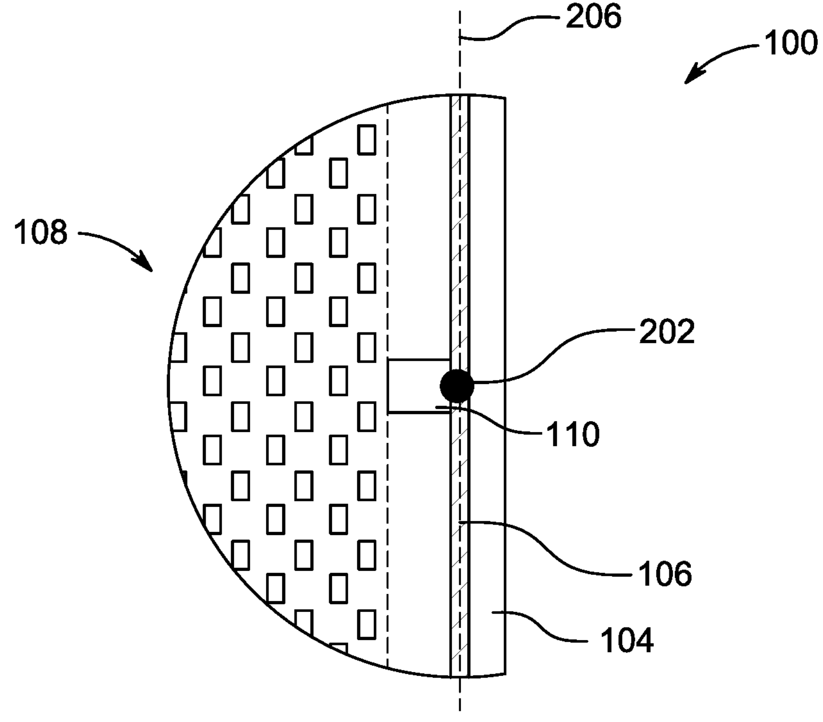
FIG. 2A shows the node oriented in a vertical position with center of mass (COM) at center of the node, without an antenna wire, and closer to where a battery would be housed, in accordance with an embodiment of the present invention.

FIG. 2A shows the node 100 oriented in a vertical position with center of mass (COM) 202 at center of the node without the antenna wire 114, in accordance with an embodiment of the present invention. For the sake of clarity, FIGS. 1C and 2A illustrates the flat portion 102 oriented in the vertical position and an approximate location of the COM 202 highlighted with a dark dot.

In one embodiment, shifting of the COM 202 closer to the flat portion 102 may increase the chances of the node 100, when scattered randomly (or not so randomly), to come to rest more often on the flat portion 102 (as is true with all shapes, where shifting the COM 202 closer to one side increases the likelihood of it coming to rest on that side). Therefore, the battery, being the densest component, may be optimally located adjacent to the flat portion 102 (or ground, floor or bottom surface) and the PCB on top of and adjacent to the battery.

Figures 2B, 2C:
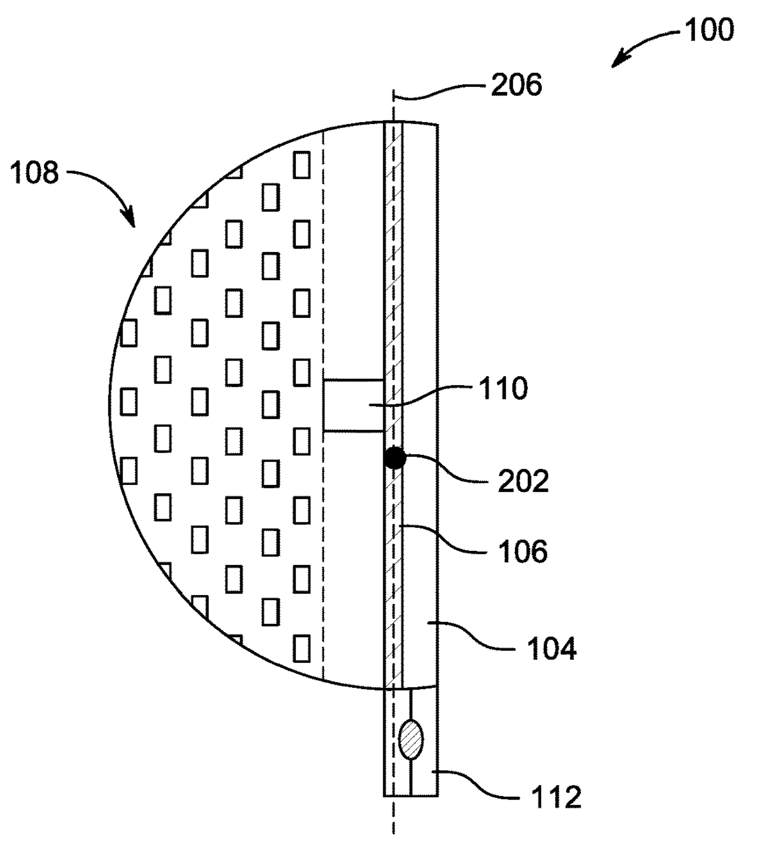
FIG. 2B shows the node oriented in the vertical position with the COM shifted towards the metal tab, in accordance with an embodiment of the present invention.
FIG. 2C shows the node oriented in a vertically tilted position with the COM shifting at an inclination towards the metal tab, in accordance with an embodiment of the present invention.

FIG. 2B shows the node 100 oriented in the vertical position with the COM shifted towards the metal tab 112. As shown in FIG. 2C, the node 100 is oriented in the vertical position such that the metal tab 112 is attached at the top edge of the node, whereby the COM is raised, making it more likely to tip toward the right in that figure, such that the node is more likely to come to rest on its flat side. Due to the weight of the metal tab 112, the COM 102 as shown earlier in FIG. 2A, placed at the center of the node 100, now shifts downwards towards the metal tab 112. In one embodiment, the degree of shift of the COM 202 depends upon the weight of/carried by the metal tab 112. As the weight of the metal tab 112 increases, the degree of shift of the COM 202 increases—i.e., the COM 202 shifts more towards the metal tab 112.

FIG. 2C shows the node 100 oriented in a position tilted from vertical with the COM shifting at an inclination towards the metal tab. As shown in FIG. 2C, the node 100 is positioned in vertical direction. One side of the node 100 is attached with the metal tab 112. Due to the addition of weight to the metal tab 112, the COM 202 shown earlier at the center of the node 100 (FIG. 2A), shifts towards the direction of the metal tab thereby establishing COM 204. Consequently, due to the shift of COM 202 to COM 204, the node 100 is more likely to come to rest flat side down. In one embodiment, the shifting of the COM 204 allows the node 100 to be positioned over the flat portion 102 instead of the curved portion 108. For example, if the node 100 were tumbling and nearly at rest in the position as shown in FIG. 2C, then the COM 204 is further from the center line versus COM 202, thus exerting a greater force on the node 100 toward the direction of the COM 204 to pull it in that direction and possibly overcome momentum from motion that might otherwise carry the node onto the domed side as it comes to rest.

Figure 2D:
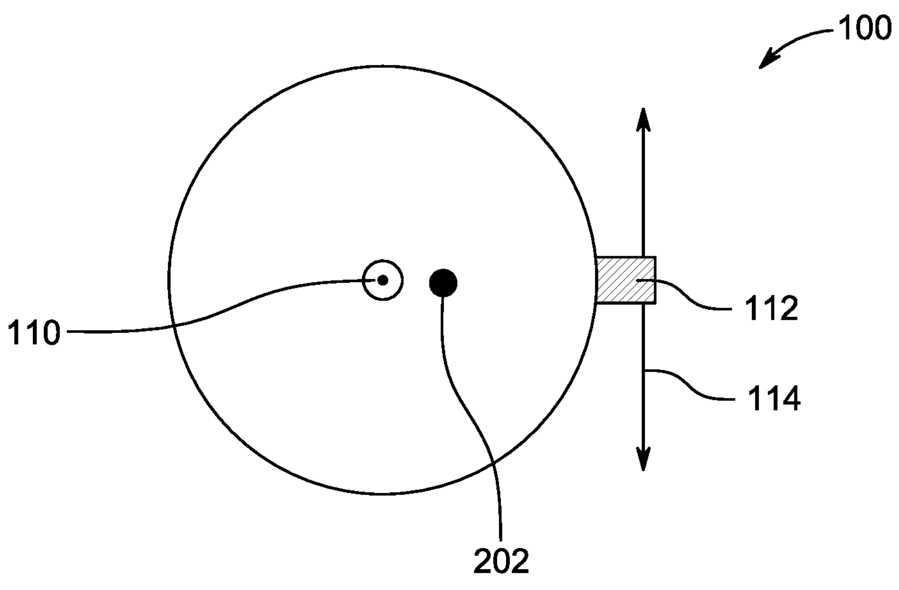
FIG. 2D shows a top view of the node with the COM shifted towards a side where the antenna wire is attached, in accordance with an embodiment of the present invention.

FIG. 2D shows a top view of the node with the COM 202 shifted towards a side where the antenna wire 114 is attached. As explained above, the shifting of the COM 202, as shown in the top view of the node 100 (FIG. 2D), illustrates that when the metal tab 112 is attached to the node 100, the COM 202 starts to shift towards the metal tab 112. In one embodiment, the metal tab 112 may also be configured with the antenna wire 114. The addition of antenna wire 114 further increases the weight of the node in a direction towards the metal tab 112, and thereby further shifts the COM 202 in a direction towards the metal tab 112.

In an exemplary embodiment, the system is designed for redundancy in many aspects, including the "reach" or range of PIR sensors, such that, in one aspect, a human passing through the grid or mesh would trigger potentially several, or even many, PIR sensors simultaneously (10-20 in most conditions), depending on the density of nodes, as well as, ground and weather-related conditions. Even for vibration sensors (or "accelerometers", herein used interchangeably) the system would be configured, in most cases, to have redundancy with PIR sensors both in terms of reach of PIRs in optimal weather conditions, but even when degraded by rain, snow, fog or hot sun. However the system employs more than one sensor type, providing added redundancies or abilities to function when one sensor is temporarily degraded, which is necessary for the system to be effective in nearly all-weather conditions, geographies, vegetation types, etc. In a further aspect, the system is configured to allow communications between Sensor Nodes, wherein there are many communication paths providing redundancies to ensure that communications are not disrupted fully, even with a direct attack or jamming of a portion of the grid.

In an embodiment, the system also provides redundancies for uplinks, whereby multiple Communication Nodes which have more processing power may provide uplinks. In a further embodiment, no one node or nodes is essential to provide intra-grid communications, analytics, or other processing of grid operations such as evaluating-within the grid—the likelihood and potential path of incursions using sensor nodes or Communication Nodes. In yet an even further embodiment processing of grid operations may be provided at the data/communications center, thereby providing additional redundant capabilities, including if, for example, communications are disrupted and the data/communications center is not reachable for any reason.

Figure 3A:
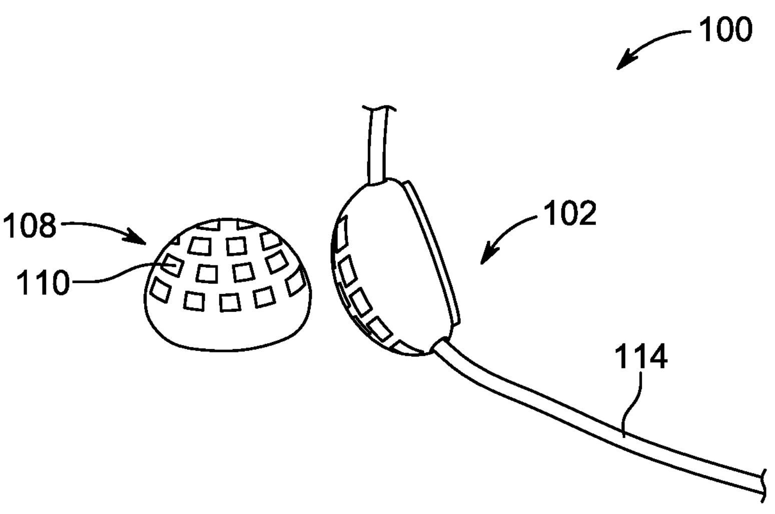
FIGS. 3A-3F shows the node coupled with an antenna wire in multiple configurations, in accordance with an embodiment of the present invention. The FIGS. 3A-3F also show the impact of the wire antenna or tail relating to the position and orientation of the node orientation when it might come to rest after being randomly scattered-nearly always with flat side down or other variation, with nearly no nodes fully flat-side up (and PIR sensor and lens facing directly down)
Figure 3B:
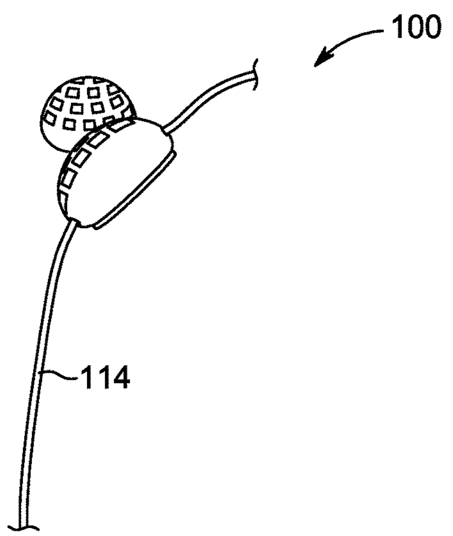

In an exemplary embodiment, FIGS. 3A-3F show the node 100 coupled with the antennae wire 114 in multiple configurations. FIG. 3A may be described in conjunction with FIG. 3B. In FIG. 3A the node 100 is shown coupled with the antenna wire 114. Further, another node 100 is shown/placed detached from the antenna wire 114. In one embodiment, the antenna wire 114, passing through the metal tab 112, is oriented in such a manner that the node 100 when contacting a surface repositions itself in an upright position as shown in FIG. 3A and FIG. 3B. In an aspect of the present embodiment, when the node 100, including the wire 114 is placed, dropped, or otherwise scattered over the ground surface in a vertical position or downward position, the resulting orientation(s) of the antenna wire 114 in conjunction with the shifted COM 202 allows the node 100 to be repositioned towards the flat portion 102.

Figure 3C:
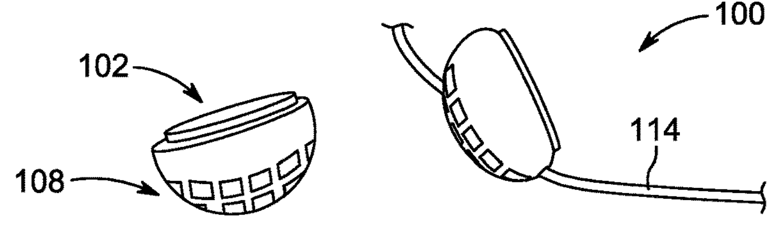
Figure 3D:
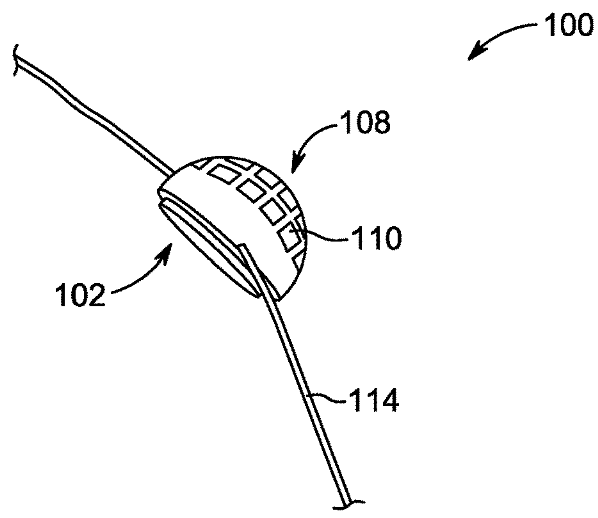
Figure 3E:
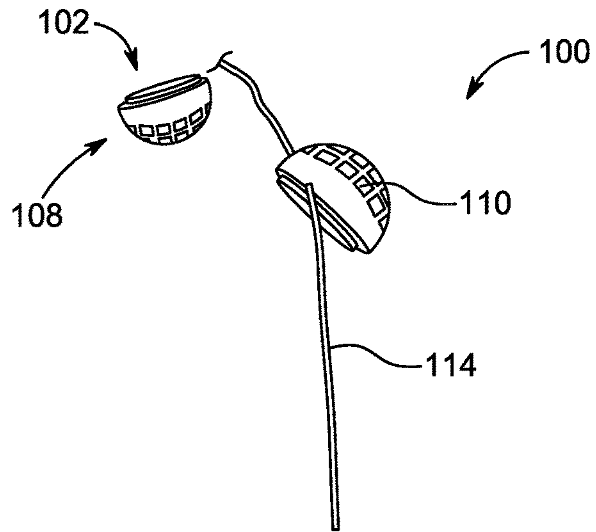
Figure 3F:
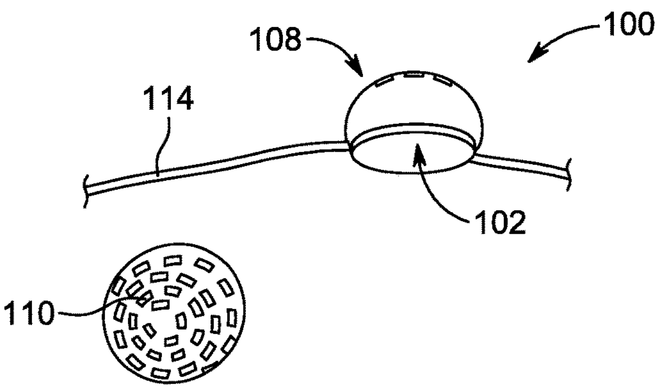

FIG. 3C, described in conjunction with FIG. 3E, illustrates the node 100 coupled with the antenna wire 114. In an aspect, in the absence of the antenna wire 114, the node 100 may come to rest upside (or face) down, as shown in FIG. 3C. Such a position of the node may adversely impact the potential (i.e., reduce the potential) of the PIR sensor 110 to effectively detect human activity given that the PIR sensor 110 is not deployed facing in an upwards direction. Without the inclusion of the antenna wire 114, the node 100 may be deployed in an upside-down position. In this case, the range of the PIR sensor 110 may be reduced due to the positioning/location of the PIR sensor 110. Since the PIR sensor 110 is positioned over the curved portion 108 as shown in FIG. 3F, the PIR sensor 110 may be obstructed by the ground or similar surface. Further, it is contemplated that the location of the PIR sensor 110 may be over the curved portion 108 as illustrated in FIG. 3F. As such, the antenna wire 114 may be oriented and configured in a manner such that when attached to the node 100 repositions the node in an upright position upon deployment on the ground or other surface due to the shift of the COM 202.

Likewise, FIG. 3D shows the node 100 attached with the antenna wire 114, said wire being placed through the metal tab 112. In an exemplary embodiment, the wire 114 is configured to provide spring-like means for the node 100 to be oriented in an upright position when the node contacts the ground or other surface. In another embodiment, the node 100 with the antenna wire 114 may come to rest in a position other than purely face up or face down, and still provide an orientation where the majority of the PIR sensor 110 is functional (i.e., facing somewhere other than the ground). The wire itself, both through its weight and impact on the COM and through the simply interfering with the node tending toward landing with flat side facing fully up, can greatly reduce the probability of the node landing other than fully flat side up, thus preserving full or significant PIR sensor functionality for the vast majority of nodes.

In yet another embodiment, the combination of the attached antenna wire 114, wherein the wire is fashioned with a slight curvature (e.g., in the form of an arc), allows the node 100 with the antenna wire 114 to come to rest against the ground, as shown in FIGS. 3A, 3C and 3F, or with the antenna wire 114 just off the ground or other surface, as shown in FIGS. 3B, 3D and 3E. In a further embodiment, the node 100 attached with a straight antenna wire 114 may come to rest on the curved portion 108, due to the weight of the antenna wire 114. Even further, in the case of the node 100 being positioned over the curved portion 108, the weight of the antenna wire 114 provides means for the node 100 to partially or completely rock towards the flat portion 102 as shown in FIGS. 3A and 3C.

FIGS. 4A-4E shows the node 100 coupled with the antenna wire 114 extending from either side of the node 100, according to an embodiment of the present disclosure.

Figure 4A:
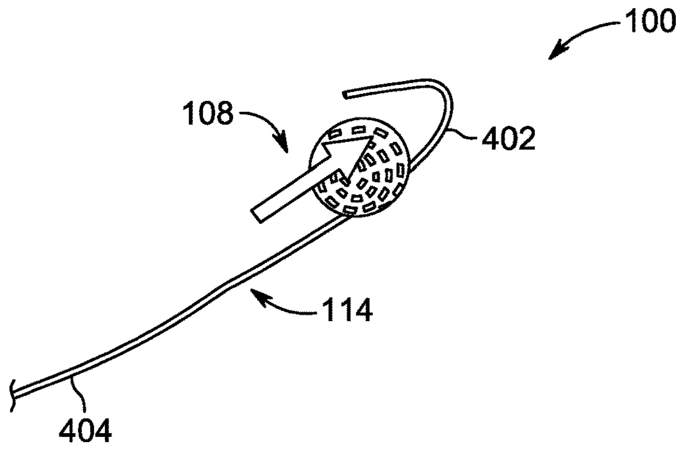
FIGS. 4A-4E shows the node coupled with the antenna wire extending from either side of the node, in accordance with an embodiment of the present invention.

FIG. 4A shows the node 100 delineated with a shorter section 402 of the antenna wire 114 at one end and a longer section 404 of the antenna wire 114 at the other end. In an exemplary embodiment, as the node 100 is released/deployed, the slight wind drag over the longer section of the antenna wire 404 provides means to enable the node 100 to be oriented in such a manner that the longer section of the antenna wire 404 faces in an upwards direction and the shorter section 402 of the antenna wire 114 (heavier end where the node is connected) faces in a downward direction. This orientation being herein referred to as the section of wire at "front" (or "tip") of the node 100.

Figure 4B:
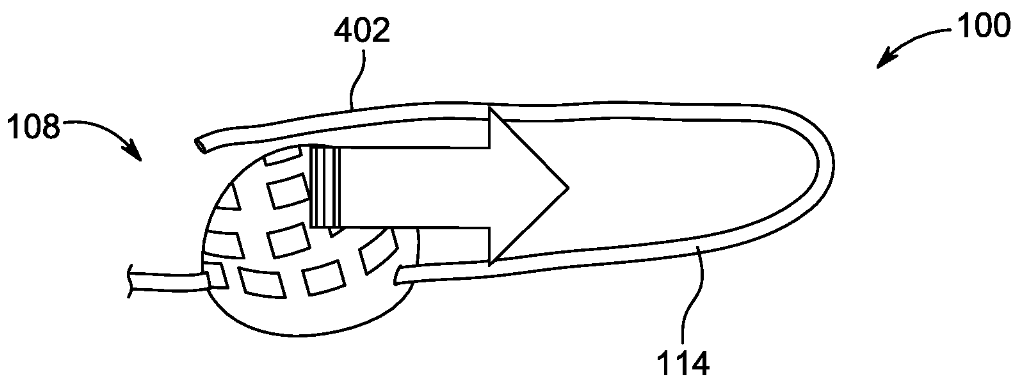
Figure 4C:
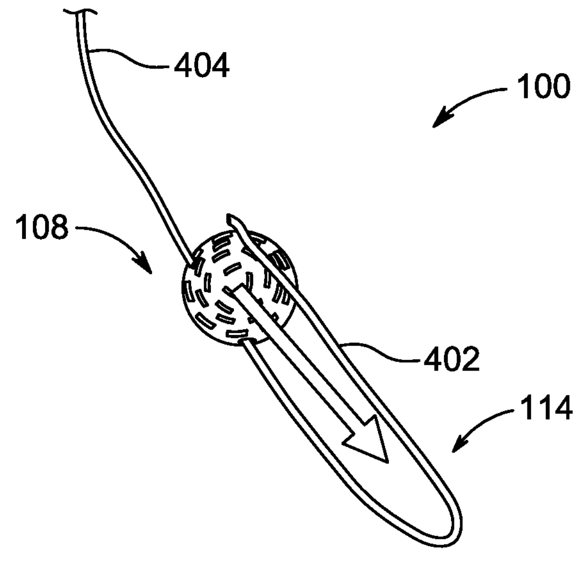
Figure 4D:
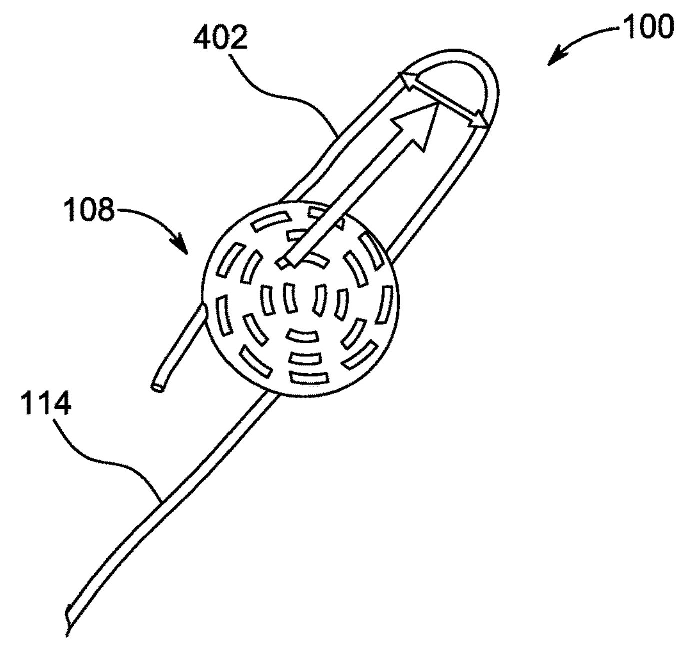

FIG. 4B and FIG. 4C shows the node 100 delineated with the shorter section 402 of the antenna wire 114 configured as a loop with an end extending back toward the curved portion 108. In one embodiment, the shorter section of the antenna wire 114 is a "U" shaped configuration. Further, FIG. 4D shows the node 100 with the shorter section 402 of the antenna wire 114 shaped in "J" shaped configuration. When dropping the node 100 onto the ground/surface, the "J" or "U" shaped configurations allow the impact forces applied over the antenna wire 114 to be reduced (less acceleration over a longer distance and/or time). In an aspect, if the node decelerates to stop/rest over a longer distance, it experiences less force from acceleration (i.e., more cushioning) and thus is less likely to be damaged. Likewise, if the node decelerates to stop/rest over a longer distance, it experiences less force from acceleration/deceleration and thus less likely to be damaged. So generally, anything that extends the time or distance (such as cushioning) or makes deceleration more uniform, protects from risk of impact damage. The antenna wire 114 is configured sufficiently flexible in order to deform upon landing with i) the tip generally impacting the ground first, and ii) the tip bending and absorbing impact energy while extending the time and/or distance over which the node 100 may decelerate from its decent speed to come to rest on the ground.

Figure 4E:
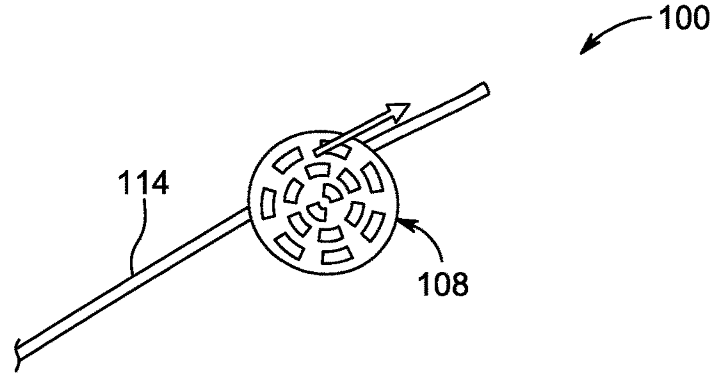

Further, as shown in FIG. 4E, the node 100 may be slidably connected to the antenna wire 114. In an aspect, a predetermined frictional force acting between the surfaces of the antenna wire 114 and the node 100 may enable the node 100 to stay in a fixed position. Further yet, the functional force may be adjusted to be sufficiently less such that the node 100 may be enabled to slide along the antenna wire 114 more slowly and over a longer distance and time from the ground surface when an end of the antenna wire 114 absorbs impact energy. Additionally, as shown in FIG. 4D, the tip of the antenna wire 114 may be configured in a "U" shape and attached to the node 100 on two places (opposite sides) of the node 100 such that the node 100 has friction contact points that enable it to slide along the antenna wire 114. Further, in this configuration, the antenna wire 114 is allowed to deform and/or the node 100 is allowed to potentially slide along the antenna wires 114 at impact with the ground or other surface.

Figure 5A:
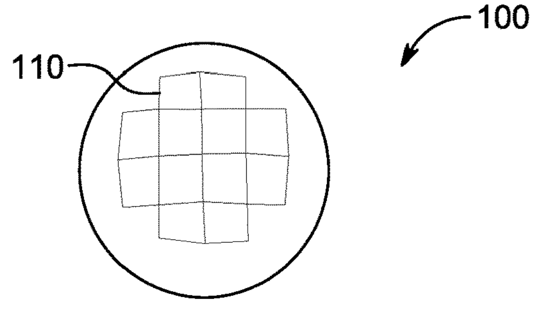
FIG. 5A shows a top view of the node integrated with passive infrared (PIR) sensors, in accordance with an embodiment of the present invention.
Figure 5B:
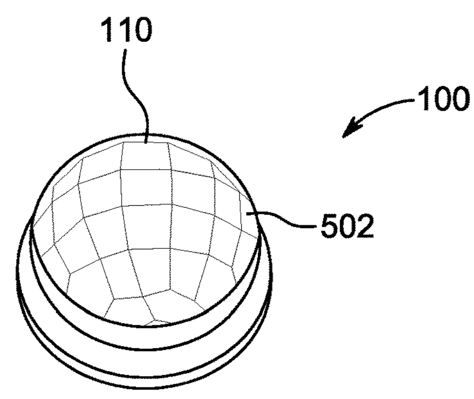
FIG. 5B shows a perspective view of the node with PIR lenses, in accordance with an embodiment of the present invention.
Figure 5C:
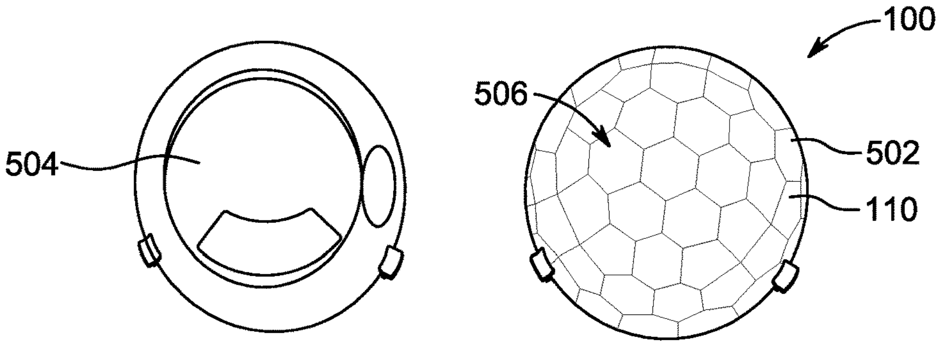
FIG. 5C shows a top view of the node in an opaque white plastic form and in a tinted form, in accordance with an embodiment of the present invention.

FIGS. 5A-5B illustrates a top view of the node 100 integrated with the PIR sensor 110, according to an embodiment of the present disclosure.

In an embodiment, FIG. 5A may be described in conjunction with FIG. 5B. With reference to FIG. 5A a PIR sensor 110 comprises one or more facets 502. In another embodiment, an exemplary node 100 might have a non-faceted area below or outside of the faceted areas as well.

In an embodiment, a node 100 may have various external configurations in order to reduce visibility of the nodes. As such, nodes may be produced in an opaque white plastic form, as well as a tinted colors, that might better blend into the landscape, using texture and/or coloration to reduce the visibility of the node. By way of example, the texture and/or coloration of the node configuration may be determined based upon the location where the node 100 is to be placed. The node 100 may be a tinted one, for instance, in environments where such colors/tints are predominant or prevalent. In yet another embodiment, the opaque white plastic form of the node 100 may be generally used where the node 100 is buried under the ground. Further, the tinted node 100 may help the light reflected from the ground surface to pass through the node 100 allowing camouflage of the node 100 with the ground surface. The aforementioned examples are not intended to be limiting of the scope of the invention in any way as many combinations of colors/tints and textures may be used for a node 100.

Figure 5D:
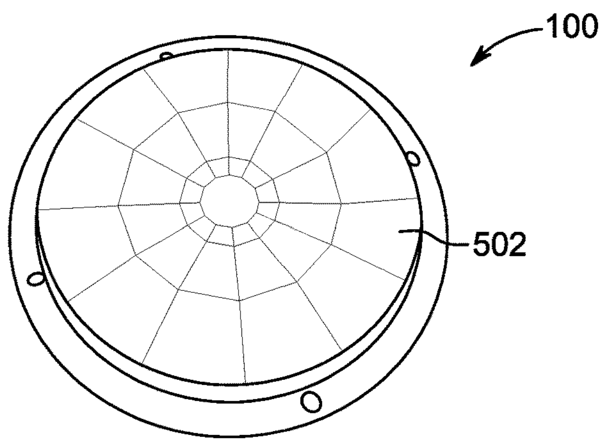
FIG. 5D shows another perspective view of the node with dome shaped PIR sensors, in accordance with an embodiment of the present invention.

In yet another exemplary embodiment, FIG. 5D shows a perspective view of the node 100 configured in an opaque white plastic form. The opaque white plastic form of the node 100 may be configured to allow for the addition of coats of one or more shades of color. Such shades of the color may be selected based upon the nature of the environment at which the node 100 is placed. In an aspect, a plurality of nodes 600 may be easily camouflaged with its surroundings.

Figure 6A:
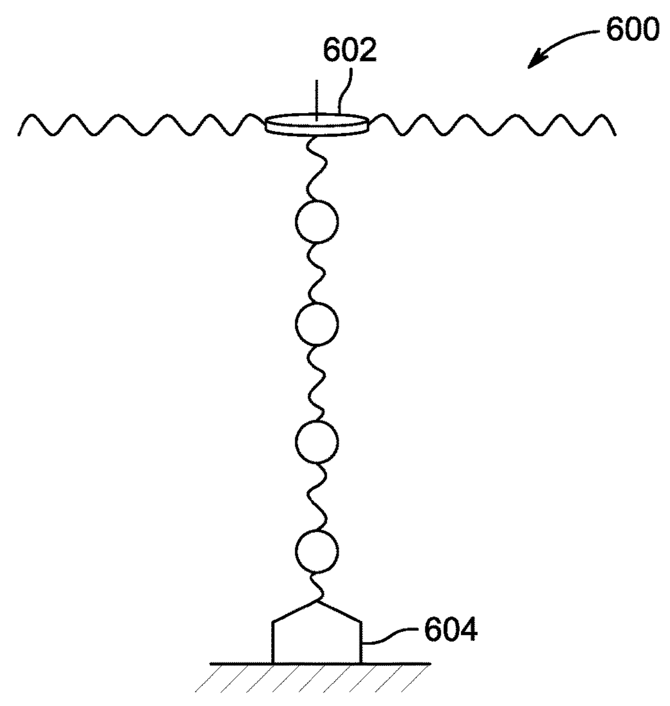
FIGS. 6A-6C show plurality of nodes arranged in a string arrangement, in accordance with an embodiment of the present invention.
Figure 6B:
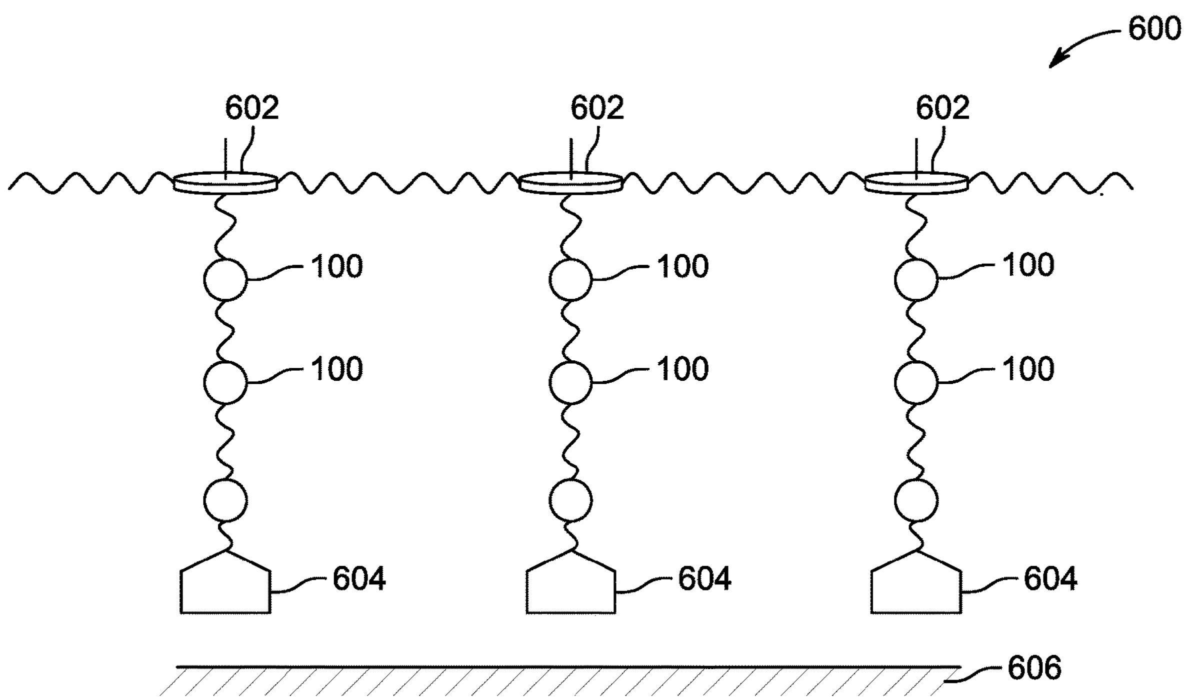
Figure 6C:
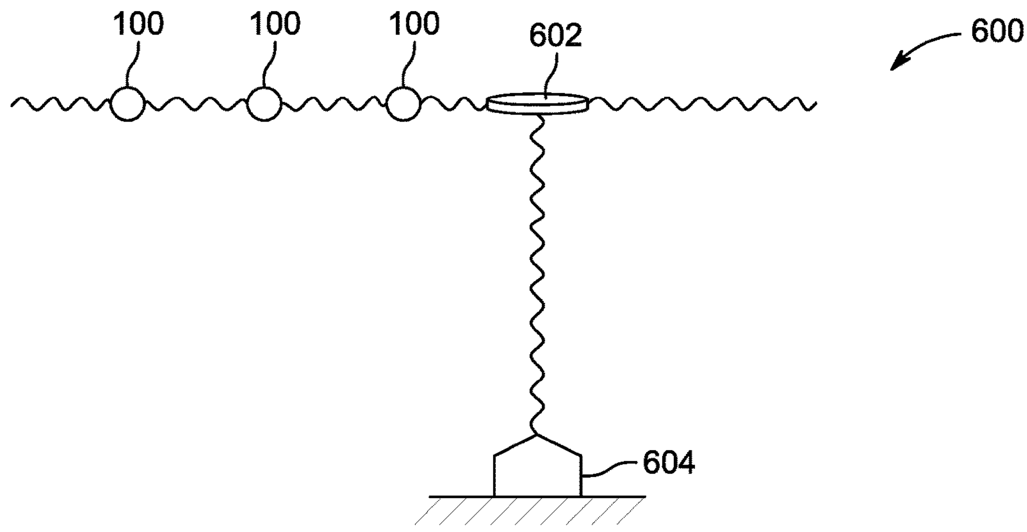

FIGS. 6A-6C shows a plurality of nodes 600 configured in a string-like arrangement, according to an embodiment of the present disclosure.

Referring to FIG. 6A, a plurality of nodes 600 is illustrated in a string-like arrangement. In one exemplary embodiment, the string arrangement may comprise a flotation device 602 and a weight 604. In a further exemplary embodiment, the floatation device 602 may be configured as a junction from where multiple strings of the plurality of nodes 600 may be attached. Further, the plurality of nodes 600 may be attached to the weight 604 wherein the weight 604 (in an exemplary mode a sinker) may be placed or otherwise located beneath a water/fluid line surface such as by way of gravitational pull. It is envisioned that configuring the plurality of nodes 600 with the weight 604 will allow the plurality of nodes 600 to stay in a stable position. In one embodiment, it is envisioned that such a configuration may be helpful in cases where the plurality of nodes 600 are deployed over a water surface.

In yet another embodiment, FIG. 6B shows the plurality of nodes 600 configured in a string-like arrangement and connected by the antenna wire 114 to form "strings" consisting of multiple nodes 100. The wire 114 may be used to physically connect the plurality of nodes 600 to form strings while also to connecting the plurality of nodes 600 electronically in order to establish communication between the plurality of nodes 600. Furthermore, the plurality of nodes 600 arranged in a string may also be connected with the flotation device 602 and/or the weight 604. The flotation device 602 and the weight 604 may be configured to serve as an anchor to both ends of the antenna wires (or other form of antenna) 114. Further, the weight 604 may be fully extending (stretched) so that the connecting wires remain above/on a below waterline surface 606 thereby enabling the plurality of nodes 600 arranged in a string to float with tides, currents, etc. of water/fluid bodies. In another embodiment, an antenna (now shown) may be integrated in the flotation device 602 and connected to the plurality of nodes 600. As such, the antenna may be configured to establish communication through air and/or under water.

FIG. 6C illustrates the plurality of nodes 600 configured in an exemplary group configuration—e.g., horizontally. It is envisioned that such an arrangement or configuration allows the plurality of nodes 600 to be laid over multiple surfaces and over longer distances. The flotation device 602 and the weight 604 will generally keep the group of the plurality of nodes 600 in a more or less straight line and spaced out to better monitor a given space.

Figure 7:
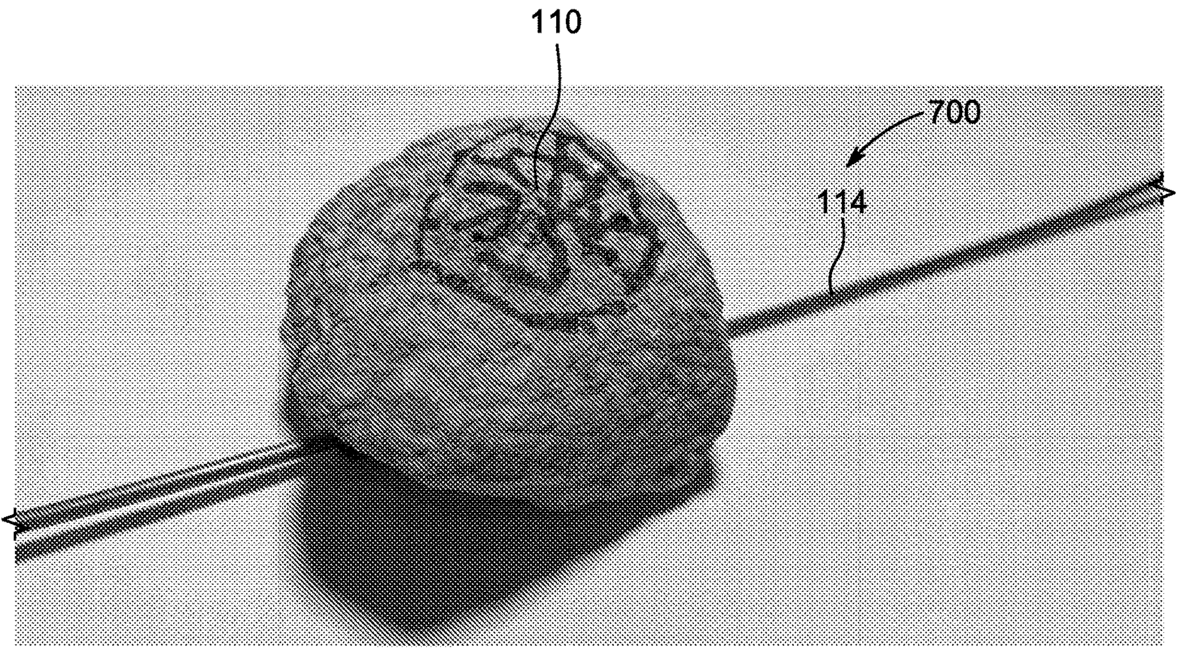
FIG. 7 is an example of a node camouflaged as a rock, in accordance with an embodiment of the present invention.

In an exemplary embodiment, FIG. 7 illustrates the node 100 camouflaged as a rock 700, according to an embodiment. It is envisioned that the node 100 may be fabricated in such a manner to look like the rock 700 or like other naturally occurring elements in its environment to aid in its camouflage. In one embodiment, the surface of the rock 700 may be fabricated with a dome structure to house the PIR sensor 110 for intruder detection.

Figure 8A:
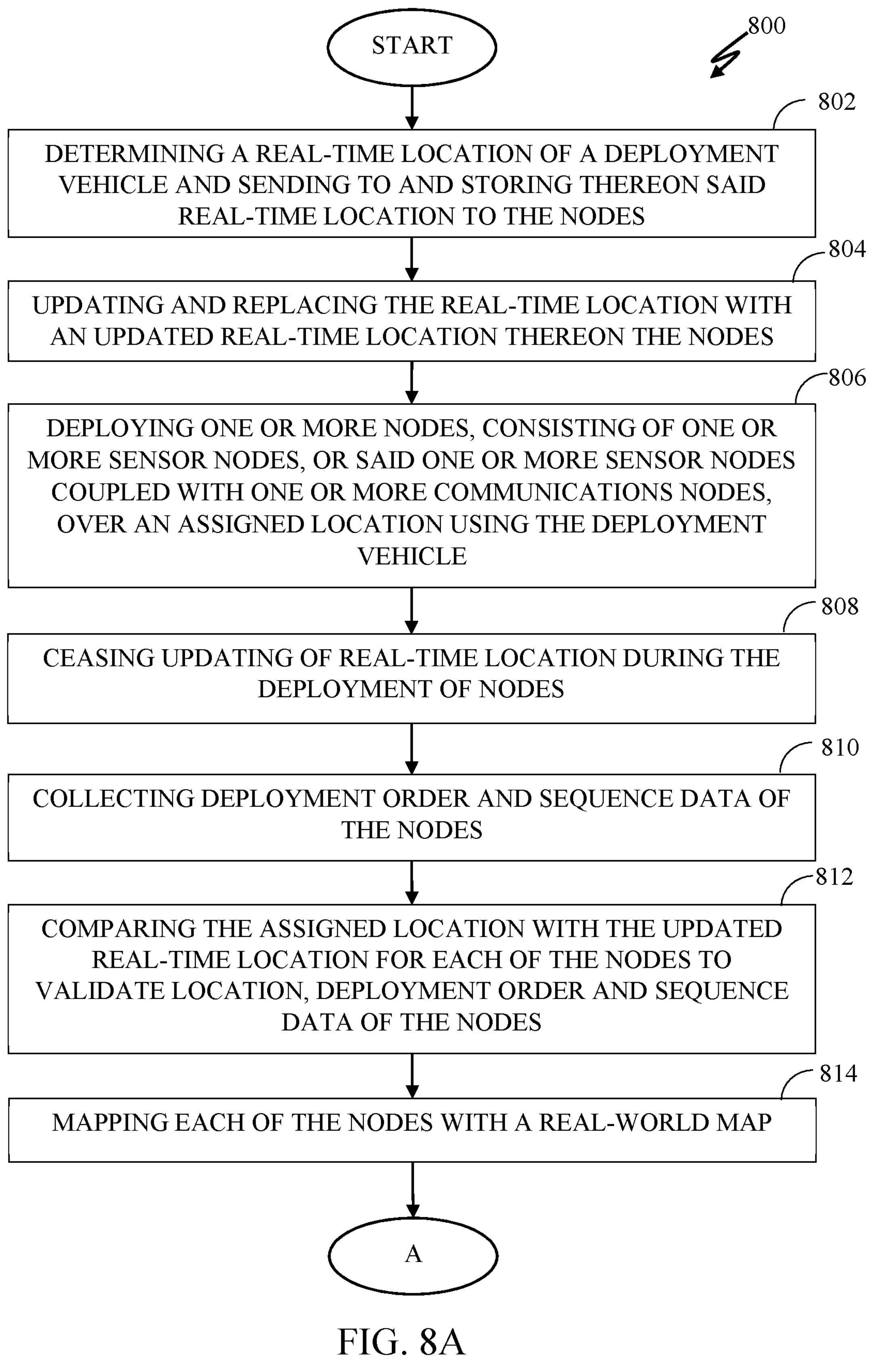
FIGS. 8A-8B illustrates a flowchart of a method for deploying and mapping a plurality of nodes, in accordance with an embodiment of the present invention.
Figure 8B:
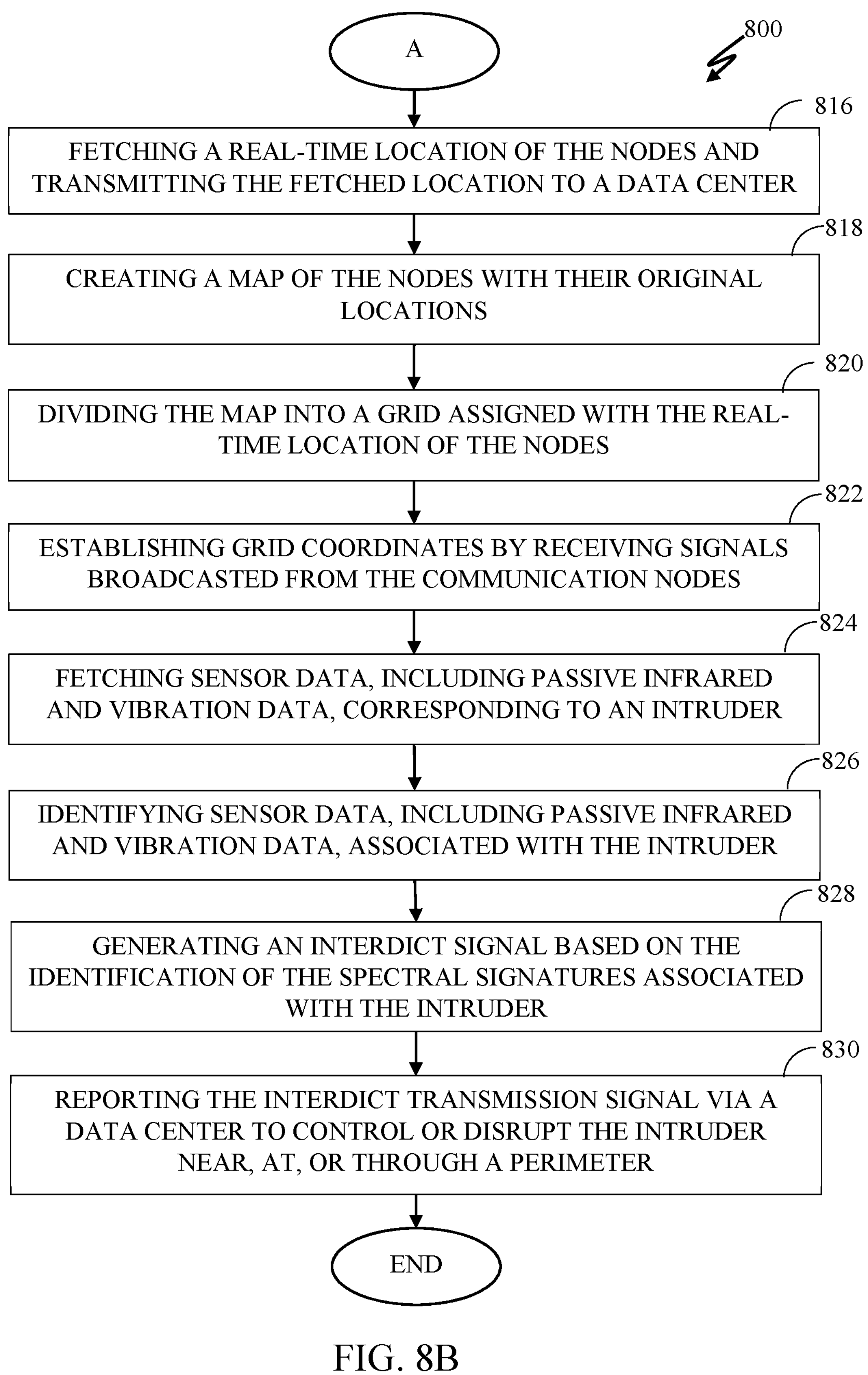

FIGS. 8A-8B illustrate a flowchart for a method 800 of deploying and mapping a plurality of nodes 600, according to an embodiment of the present disclosure.

As an exemplary first step, the method involves determining a real-time location of a deployment vehicle and sending to and storing thereon said real-time location to the plurality of nodes 600, at step 802. In one example, a drone is used as the deployment vehicle by a US military force. The drone is stored with 500 nodes. The drone is installed with a GPS module that determines real time location of the drone in Arizona at 10:00 AM as 34.0489° N, 111.0937° W and sends this information to the plurality of nodes 600. In another example, a drone carries 100 sensor nodes and 10 communication nodes, wherein every $10^{th}$ of the node 100 is coupled with a communication node. As an example, a drone deploys 100 sensor nodes and 10 communication nodes over a specified location.

Successively, updating and replacing the real-time location with an updated real-time location thereon the plurality of nodes 600, at step 804. For example, the drone after 10:01 AM is at Alaska and send updated real time coordinates to the 500 nodes as 33.0872° N, 109.0370° W.

Successively, deploying one or more nodes, consisting of one or more sensor nodes, or said one or more sensor nodes coupled with one or more communications nodes, over an assigned location using the deployment vehicle, at step 806. For example, the drone deploys the 500 nodes over an assigned location over Alaska having coordinates as 30.0872° N, 102.0991° W for $1^{st}$ node, 28.0202° N, 100.9182° W for $2^{nd}$ node.

Successively, ceasing updating of real-time location during the deployment of the plurality of nodes 600, at step 808. For example, the last updated real time location saved within a $1^{st}$ node as 30.0872° N, 102.0983° W, for a $2^{nd}$ node as 30.0273, 102.0983° W is extracted and saved within a data center linked with the 500 nodes.

Successively, collecting deployment order and sequence data of the plurality of nodes 600, at step 810. For example, the data center determines deployment order and sequence data of 500 nodes in the formation of location L1 with node nos. 1, 2, 3, 4, 5, location L2 with drone nos. 6, 7, 8, 9, 10 and so on up to $500^{th}$ drone.

Successively, comparing the assigned location with the updated real time location for each of the plurality of nodes 600 to validate location, deployment order and sequence data of the plurality of nodes 600, at step 812. For example, the data center compares the updated location of $1^{st}$ node as 30.0872° N, 102.0983° W with assigned location as 30.0872° N, 102.0991° W. similarly comparing updated location of $2^{nd}$ node as 30.0972° N, 102.1033° W with assigned location 28.0202° N, 100.9182° W.

Successively, mapping each of the plurality of nodes 600 with a real world map, at step 814. For example, mapping the coordinates of the $1^{st}$ node 30.0872° N, 102.0983° W with real world google map location and similarly, mapping the coordinates of the $2^{nd}$ node as 30.0972° N, 102.1033° W with real world google map location.

In one embodiment, the GPS module, wherein the module may be built into a device, mounted on a vehicle, or carried by drone or person, may be configured to calculate location coordinates of the drone or other deployment vehicle or accompanying device(s) and may assign the plurality of nodes 600 which when are landed, deployed and/or otherwise placed on the ground (or location) set with their coordinates. In another embodiment, by assigning GPS module from a deployment vehicle or other device capable of reading and sharing GPS location information, additional and/or extraneous system costs may be reduced by avoiding the cost of adding a GPS chip to each of the nodes in the plurality of nodes 600.

In one embodiment, GPS locations may be assigned to each of the plurality of nodes 600 by continuously broadcasting the updated GPS location to all the plurality of nodes 600. Thereby, each of the plurality of nodes 600 may receive and temporarily store the updated GPS locations, each time discarding the previously broadcasted location and replacing it with the new, current locations. As the plurality of nodes 600 are dispensed and deployed (such as from the drone) and/or contact the ground, the plurality of nodes 600 may cease providing the updated GPS location information. In one embodiment, the final GPS location after the plurality of nodes 600 hit the ground surface may be calculated based on the last GPS location detected before falling over the ground surface and adding the movement of the plurality of nodes 600 after hitting the ground surface. Based on the degree of movement of the plurality of nodes 600, the final GPS location can thereby be calculated.

In one embodiment, the deployment order and sequence may be collected, to further validate the accuracy of GPS location of the plurality of nodes 600 calculated by enabling comparison of the initially assigned GPS location against a known sequential order of deployment (and presumably the sequential order along any vector in the field) of the plurality of nodes. Further, the sequential order (the relative location of nodes versus other nodes) may provide added verification and means to double check the accuracy of assigned or calculated GPS locations and may enable corrections as required and enabled. Once GPS-mapped, each of the plurality of nodes 600 may be mapped to real world maps, after which the system and nodes may provide an alternative navigational tool without the original GPS mapping of any single nodes' coordinates, and without using satellites.

Further, the method comprises fetching a real-time location of the plurality of communication nodes and transmitting the fetched location information to a data center, at step 816. For example, a 1st communication node fetches a real time coordinate in Alaska as 30.0872° N, 102.0983° W, similarly a 2nd communication nodes fetch a real time coordinate in Alaska as 32.0092° N, 105.8722° W and so on.

Successively, creating a map of the plurality of communication nodes with their original locations, at step 818. For example, a data center creates a map by joining the coordinates received from each of the communication nodes.

Further, dividing the map into a grid assigned with the real-time location of the nodes, at step 820. For example, the map created is now divided into grids or triangles with real-time location of the nodes.

Successively, establishing grid coordinates by receiving signals broadcasted from the communication nodes, at step 822. For example, the coordinates 30.0872° N, 102.0983° W of a triangle or grid is established after receiving signals from the communication nodes.

In one embodiment, the communication nodes may be enabled and/or configured with the GPS module (with GPS chip), while the plurality of sensor nodes 600 may not be enabled and/or configured with the GPS module. In an aspect, the plurality of nodes 600 may also be termed as a plurality of sensor nodes 600. In another embodiment, drones may be used as aerial vehicles for dispensing/deploying the plurality of communication nodes and the plurality of sensor nodes 600. In another aspect, however, other types of deployments, including more rapid deployments (e.g., via plane), may also be used where precise GPS locations would not be known when nodes were released or otherwise deployed. In one embodiment, the plurality of communication nodes may be enabled and/or configured with the GPS module, itself, configured to further map the remainder (and vast majority) of the plurality of sensor nodes 600.

In yet another embodiment, the GPS locations calculated by the plurality of communication nodes may be shared with the data center. The data center may be configured to manage the mapping processes of each of the plurality of sensor nodes 600. Further, the GPS locations determined by the plurality of communication nodes may be used to generate the map. In an exemplary embodiment, mapping of the plurality of sensor nodes 600 may take place by first using the "mapped" nodes (of any type) to divide the space (and nodes) to be mapped into triangles. Further, each of the triangles may be mapped with location using the plurality of nodes 600 already mapped.

It is an object of the present disclosure that inside of each of the triangles there comprises a plurality of sensor nodes 600. In an aspect, a triangle may comprise, initially, thousands of a plurality of sensor nodes 600.

In accordance with the present disclosure, other related techniques may be available to subsequently distinguish which of a plurality of sensor nodes 600 are the true or closest to the assigned or calculated GPS location. Furthermore, in accordance with the present disclosure, it is not necessary to map every node perfectly (and in fact there may be more than one node assigned the same GPS location). Though creating such triangles is a preferred technique for the process(es) embodied in the present disclosure, alternatively dividing the space or grid into other shapes, for example, is possible despite a reliance on more complex processes and algorithms. Once mid-points are established for all (three) sides of each of the triangles, the original triangle and nodes inside that triangle would further be divided into four smaller triangles, wherein each of the calculated mid-points establishes a vertex for those smaller sub-triangles.

Each mid-point node(s) may then be assigned a calculated GPS location, generally the mid-point of the known (or calculated) GPS locations of each of the corresponding two vertex points (e.g., for triangles, three such mid-points would be determined and assigned their respective GPS locations). In an embodiment, the aforementioned process would proceed simultaneously for all such triangles or such sub-triangles having been delineated initially or throughout the process. Each newly assigned vertex (previously a mid-point), along with the other two vertices, would initiate the process of finding mid-points between them and then dividing those sub-triangles into ever smaller sub-triangles (with fewer nodes in each subsequent sub-triangle) until there are no unmapped nodes.

With a smart phone (or similar device) and app to communicate and read/determine location(s) on the grid relative to the closest Nodes, the system enables, potentially more accurate navigation without GPS. A smart phone or similarly enabled device is configured to read location information using Node IDs (and their corresponding GPS location) using the closest nodes to determine accurate position using Nodes in the field. In an aspect, navigation is potentially more accurate than any one GPS location assigned to any one Node. For example, once the grid is mapped, any navigation within or near the grid, need not rely on GPS—using only the information stored in the nodes, said information being durable, expandable, and without the ongoing need for GPS satellites.

In an embodiment, navigation on or near the grid is undertaken using the previously mapped GPS location information and stored in the grid (and/or remotely stored) in each node. Such navigation may be enabled with an app on a smart phone and provide more accuracy than the GPS precision enabled in such smart phone. In an aspect, navigation is provided after the initial mapping even without any further availability of GPS satellites. Furthermore, in instances where there are significantly fewer nodes (Sensor Nodes or Communication Nodes) accurate navigation may be determined through app by the user by using varying BLE broadcast power or time lag for BLE or other broadcasts to determine the relative distance of the operator holding the smart phone (or other enable device) with the closest sensor node 100. Thereby, approximate location may be estimated using the various estimated distances from a local sensor node to navigate accurately through the grid.

In an embodiment, where the nodes in a plurality of sensor nodes 600 are at further distances apart (e.g., 100 yards), BLE or other communication tools provide capabilities to determine position of the user based on estimated distance from closest sensor node. A smart phone/device provides a unique identification code, or other form of digital identification, to verify team members versus other activity or humans ("others") detected in the grid. In an alternative embodiment, beacons or tags may also be worn by team members to readily identify team members versus others that might trigger sensor activity. Further, Communications Centers are configured to identify "friend" versus "unknowns" (or "foe").

Further, the method comprises fetching sensor data, including passive infrared and vibration data, corresponding to an intruder, at step 824. For example, a PIR sensor data detects high digital pulses at time frames between 10:00 AM to 10:30 AM.

Successively, identifying sensor data, including passive infrared and vibration data, associated with the intruder, at step 826. For example, a spectral signature graph is generated between time and frequency based upon the detected high digital pulses.

Successively, generating an interdict signal based on the identification of the spectral signatures associated with the intruder, at step 828. For example, presence of the intruder is determined based upon the graph pattern between the time and frequency and accordingly interdict transmission signal is generated.

Successively, reporting the interdict transmission signal via a data center to control or disrupt the intruder near, at, or through a perimeter, at step 830. For example, a notification is sent to the data center about the presence of the intruder between the time 10:00 AM and 10:30 AM.

Figure 9:
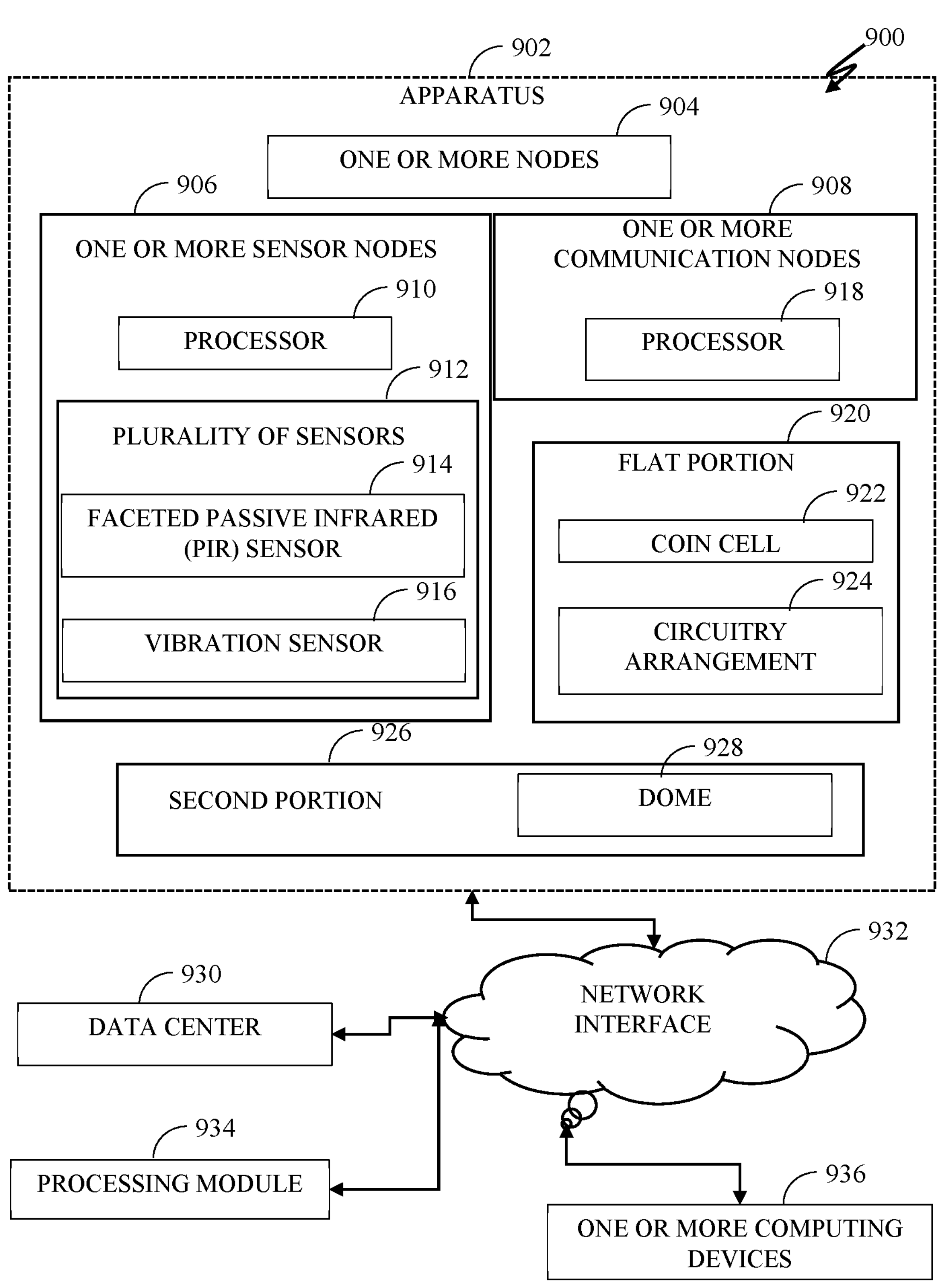
FIG. 9 illustrates a block diagram of a system for preventing intruders over a secure perimeter, in accordance with an embodiment of the present invention.

FIG. 9 illustrates a block diagram for a system 900 for preventing intruders over a secure perimeter, according to an embodiment of the present disclosure.

The system 900 comprises an apparatus 902. In one embodiment, the apparatus 902 corresponds to the node 100, as described in FIG. 1A-5D. Further, the apparatus 902 comprises one or more nodes 904, including one or more sensor nodes 906 and one or more communication nodes 908. The one or more nodes 904 consisting of the one or more sensor nodes 906 coupled with the one or more communications nodes 908, are arranged in a suitable configuration. The apparatus comprises that the one or more sensor nodes 906 consisting of a processor 910 and a plurality of sensors 912 including, at least, a faceted passive infrared (PIR) sensor 914 and a sensor to detect vibrations or a vibration sensor 916. The PIR sensor 914 is configured on a dome-shaped portion to gather and direct light reaching said dome-shaped portion to the PIR sensor 914.

Further, the one or more communications nodes 908 consisting of a processor 918. The one or more sensor nodes 906 and the one or more communications nodes 908 may comprise a flat portion 920 incorporating a coin cell 922 and a circuitry arrangement 924. The flat portion 920 may correspond to the first portion. Further, the one or more sensor nodes 906 and the one or more communications nodes 908 may comprise a second portion 926 comprising a dome 928 configured on and sealed along a periphery of the flat portion 920 to prevent humidity from penetrating inside the circuitry arrangement 924. The second portion 926 and the dome 928 may correspond to the curved portion, described above. The flat portion 920 and the second portion 926 have been described in greater detail in the preceding part of the detailed description.

Further, the system 900 may comprise a data center 930 communicatively linked to the one or more communication nodes 908 of the apparatus 902 via a network interface 932 to receive data from the one or more sensor nodes 906 and the one or more communication nodes 908. Further, the system 900 may comprise a processing module 934 linked to the data center 930, configured to process and generate one or more results from the received data using an artificial intelligence and machine learning (AI/ML) module (not shown). Further, the system 900 may comprise one or more computing devices 936 communicatively linked to the data center 930 via the network interface 932. The one or more computing devices 936 receives one or more notifications based on the one or more results related to intruders detected by the one or more sensor nodes 906.

Further, in another embodiment, each of the one or more computing devices 936 is installed with a user interface (not shown). The user interface is configured and enabled to allow users to coordinate communication (two-way with node 100), collect and manipulate data, as well as incorporate machine learning (ML) and artificial intelligence (AI) to better analyze data, patterns and recombine sensor data from the plurality of sensor nodes 600 to reconstruct signals to better detect and understand activity (include sounds, voice etc.). Furthermore, the user interface is configured to aid the user to also communicate, share data, and coordinate activities that might be triggered or directed from sensor data (actionable or otherwise), through devices such as smart phones in conjunction with apps imbedded on said smart phones/devices.

In a further embodiment, the user interface enables the user to facilitate communications such as SMS text messages, emails, phone calls, etc. which is generated by and sent from the one or more computing devices 936. Further, the user interface and computing devices enable the management of voice, video and other types of communications originating or passing there through. The user interface, in synchronization with the data center 930, provides data storage, data/information manipulation and analytical tool capabilities to understand and study all gathered data. The user interface and data center 930, is also configured to provide supporting software to better collect and parse such data, correct errors or other functions and structures (software or, for example, physical components such as backups etc.) that might become helpful or necessary to manage data and allow more effective data mining for many purposes, including AI, ML and other research. Even further, it is an object of the user interface function to provide segregation, protection, security and limiting improper access of/to data. In addition, but not limiting regarding the above, the user interface is configured to provide a portal and means for communications (one-way and two-way) enabled by the communications center, which might be accomplished simply with a website.

In one embodiment, the one or more computing devices 936 may be a smart phone or device carried or used by users (e.g., field operators) to both receive and send messages, acknowledge or turn off alerts, and to facilitate other potential remote interactions for various aspects of operation or information/status queries. Firmware and/or software of each of the main hardware components, for example, along with the website or other main information/communication backbone is configured to allow the components to communicate and share data amongst themselves, and via the web through other channels, including SMS, email, data transfer, storage services, etc.

Further, the user interface is enabled to use a grid as a communications backbone for intra-grid communications between two or more operators/agents and/or computing modules connected to the grid. Importantly, such communications within the grid may be undertaken fully using short range BLE broadcasts, passing through the mesh of the plurality of sensor nodes 600, being very low profile and hard to detect by third parties without access to such grid connectivity. Further, the user interface is configured to enable navigation on or near the grid using the previously stored and mapped GPS information stored in the grid and/or in each of the plurality of nodes 600.

In an exemplary aspect, navigation may be enabled after the initial GPS mapping and with more accuracy without any further availability of GPS satellites. Furthermore, in instances where there are significantly fewer sensor nodes 600 nodes, such accurate navigation may be enabled with the user interface using the strength or time lag of the BLE or other broadcasts, wherein the user interface determines the relative distance of the operator holding the smart phone the closest operating node 100, thus enabling to estimate the approximate location using the various estimated distances from local nodes and to thus navigate accurately through the grid.

In an exemplary aspect, without the one or more computing device 936, the system 900 is capable of directing the plurality of sensor nodes 600 to provide visual and audio clues both to navigate, interdict and locate targets (e.g., using LEDs, sounds, etc.). For example, the system 900 provides clues comprising sequentially lighting up nodes to provide directional vectors to agents, thereby enabling them to navigate without the need to reference or look at smart devices or screens. This feature may provide additional location information to the user without using screens or smart devices, as well as it may also be used to distract potentially dangerous intruders/adversaries.

In an embodiment, when combined with a smart phone or other device, the grid is enabled to function as a communication backbone. Without using long-range communications, the plurality of sensor nodes 600 creates a mesh of nodes configured to transfer messages to or from a device existing on any point in the mesh to any other point on or off the grid. In an exemplary aspect, off the grid communications may be accomplished via an uplink from the grid. Further, two-way communications are enabled to flow through the grid, providing low-visibility and alternative communications for sending and receiving text, images, files, audio, etc. Such communications, if using BLE are hard to detect, as very short range BLE or other short-distance communications signatures are configured to be only be powerful enough to reach nearby nodes, thereby making such communications very hard to detect. In an exemplary aspect, nodes located approximately 1 meter apart provide BLE broadcast power enabling communication that is node-to-node. The aforementioned arrangement of nodes in the mesh is configured to require very low power and said location(s) is optimized to broadcast communications sufficient to reach the next nearest nodes, thereby making such communications extremely hard to detect. Furthermore, in an embodiment, should there be incursions in the mesh, communications are intelligently routed away from or around such incursions to ensure such communications remain undetected.

In an embodiment of the present disclosure, the system 900 incorporates artificial intelligence (AI) and machine learning (ML) capabilities. The AI and ML, for example, is configured to gather raw data, and collect feedback from agents in the field to better predict paths, determine whether the type of sensor data or patterns is more likely to be real incursions, and compare weather-related sensor triggers to better identify real incursions in comparison to weather related noise, local area effects, and the like among other things. It is one object of the present invention that the distributed design and capabilities are intended to increase "in the field" or cloud-like computing capabilities of the large or vast numbers of lower-powered processors in the grid.

In another embodiment, the plurality of sensor nodes 600 is configured to connect directly to a smart phone or other screen-based devices with communications ranges, including those in vehicles. In one aspect, since it is not necessarily essential to share data needed for AI and ML (e.g., not mission critical aspects of operations), the system may also be run on a laptop even for very large areas, limited by of course communications latency or simply the need for more communication centers managers to oversee events, agents, and other resources.

In one embodiment, the data center 930 is configured to undertake more concurrent analyses and review longer time horizons. Further, the data center 930 is configured to consider more data stemming across multiple incursions, thereby making the center capable of managing multiple teams of agents simultaneously in the field, in the same area, and/or at least on the same or adjacent grids. In addition, the data center 930 is configured to provide overall system-wide management to manage and adjust cycle times using more historical and current information from other parts of the grid, thereby enabling longer sleep cycles in some areas and under certain conditions (traffic, weather etc.) to conserve power without sacrificing monitoring capabilities.

In further embodiment, for more remote deployments or larger grids, the system is configured to utilize longer range communication methods including LoRa (long range) communication module (e.g., Zigby, cellular, satellite uplinks, etc.) to share data and receive updates to operating parameters of the plurality nodes. In an exemplary embodiment, the plurality of communication nodes is configured to incorporate BLE as well as LoRa, or other longer-range communication protocols or methods. As such, the plurality of communication nodes is capable of communicating with the plurality of sensor nodes 600 while still having longer range and higher data communications transfer capabilities. In an aspect, other than to reduce discoverability, the communication node need not have a case similar to the plurality of sensor nodes 600 as no essential part of its function relies on its orientation on the ground after deployment.

In an embodiment, for larger distances, the plurality of communication nodes is integrated with the system, wherein communications would jump the mesh and be consolidated and retransmitted from the plurality of sensor nodes 600 to communication nodes. In this sense, it is an object of the present invention where the plurality of communication nodes transmits much faster signals and with less power than via low level, short distance mesh communications. In an exemplary embodiment, the plurality of communication nodes is placed 100 yards apart or further as conditions and capabilities permit. In a further aspect, the ratio of the sensor node to the communication node is 1:5000 or fewer.

In yet another embodiment, the data fetched from the plurality of sensor nodes 600 is transferred using BLE or other short-range communication tools and may also connect directly to a laptop serving as a communications center. It is also an object of the present invention that long range communication may also be used. In another embodiment, drones, used as uplinks, may also be used when long distances and clandestine needs are required. In an exemplary aspect, drone(s) may low fly over a portion of the grid to communicate directly with nodes to gather or share information to/from the grid, or personal devices connected to the grid.

In one embodiment, the ratio of the plurality of communication nodes to the plurality of sensor nodes 600 is 1:5000 or 1:7500 or even greater. The plurality of communication nodes may comprise much higher power and speed processors, wherein the communication nodes may consume significantly more power in order to manage communications between the plurality of sensor nodes 600. Therefore, a low-power, long-life, low-cost system, especially in enabling the reduction of data communications, processing, and other activities, including field analysis.

In accordance with embodiments of the present disclosure, a plurality of communication nodes with higher-powered processors may handle and process more data, including analysis of said data in the field. Furthermore, it is an object of the present disclosure to provide such processing and analysis in a cloud-like manner (i.e., in the cloud), thereby reducing the reliance on central processing, and reducing latency and reliance on communications links. Even further, the plurality of communication nodes is configured to manage communications with all the nodes of the plurality of nodes 600 in its "region" either directly or indirectly. In addition, it is an object of the present invention that the plurality of communication nodes with higher-powered processors is configured to undertake more sophisticated data and path prediction analysis.

In another embodiment, such higher-powered processors in the plurality of communication nodes is configured to enable especially larger grids to undertake more sophisticated processing and, over time, an increasing amount of processing within the grid, thereby reducing the need for ever larger data centers. It is therefore an object of the present invention to reduce the need for or reliance upon data centers typically required for housing and managing high resolution image systems (i.e., cameras and sensors that capture ever increasing resolution requiring correspondingly higher powered processors) whether in the field or at a Communication Center.

In an embodiment, the system is comprised of sensors (binary or scaler) wherein the quantity of data gather is more or less fixed, thereby enabling faster and more rapid (generally real-time) assessments and determination of possible incursion. Furthermore, it is an object of the present invention to utilize software/firmware and chip processing power and increased speeds to enable cloud-like processing of the plurality of communication nodes and the plurality of sensor nodes 600 in the grid. Even further, it is an object of the present invention to reduce the cost of intrusion systems. For example, the cost of the plurality of communication nodes may have very little impact on the overall cost (e.g., cost per mile) of a system. In addition, even if the plurality of communication nodes might include more powerful processors (said processors might be physically larger), including larger batteries to support higher power consumption of processors, greater data handling and longer-range communications broadcasts. Thus, processors might be replaced more often than other Nodes, or possibly incorporate solar panels for recharging.

It is yet another object of the present invention that even more frequent replacement of the plurality of communication nodes would not add significantly to the cost of the overall system or grid given that the nodes comprise a small percentage of total nodes in the system. In an embodiment, the distributed processing power among the plurality of communication nodes (including in combination Communication and Sensor Nodes), is configured to enable a "smarter" grid that relies less on data centers, reduces latency, provides in field assessments of incursions, and relays instructions or information back to agents in the field within or outside of the grid for navigation, location of targets, and the like. In a further embodiment, the plurality of communication nodes is configured to provide greater processing power in the field and within the grid, resulting from the combined cumulative processing power of all nodes in aggregate.

In another embodiment, the system 900 is configured to provide direct communication with one or more weapons systems (including missiles launched from other locations). In an aspect, the system 900 also provides targeting information (including updating) and/or redirection of weapons, such as missiles, in real time, without satellite or other sensor imaging, particularly where landscape, vegetation, weather conditions or other factors preclude gathering any positional intelligence for updating locations of targets by other means. Such updated location information may be delivered through uplinks, including predicted paths to compensate for latency of delivering sensor readings to weapons for updating and retargeting. Further, weapons might also receive updating target information directly from the plurality of communication nodes in the grid, via BLE, LoRa or other communications, which may be especially valuable in remote locations, where permitted to by the speed of the weapon.

In a further aspect, short range sensors and low-power processors also contribute to very low cost, where their use is predicated on a system designed for relying on very low data being gathered or transmitted in accordance with the present disclosure. It is also an object of the present invention that nodes (individually and even collectively) offer much lower processing power and time such that the system holistically versus prior art approaches that utilize and rely on higher resolution images have an advantage of being lower cost. In addition, lower-powered processors and the low-level processors are generally lower cost than those used in conventional systems and made to operate with significantly more efficiency, respectively. Such processors are advantaged by lower use of electric power and battery life and also provide efficient cycling between sleep and wake states (power/battery management). It is therefore a further object of the present invention that less data gathered and shared reduces processing and communications times, conserves battery life, and reduces system costs.

According to an embodiment of the present disclosure, an abbreviated data summary language is provided to establish a numerical based descriptor for a range of sensor readings, and particularly for combinations and time patterns of sensor readings. Further, at the node level, the processing module is configured to categorize sensor readings for varying patterns over various time horizons. In an exemplary embodiment, a unique two or three-digit number represents a combination of sustained PIR trigger for "X" seconds or more, and "Y" seconds accelerometer sensor reading, along with time stamps.

Translating sensor readings (data) into an abbreviated, summary language both reduces node transmission and processing times to inform other plurality of communication nodes of local readings in a more efficient manner (particularly in a power efficient manner). Furthermore, assessment in the field provides a means to establish if a potential pattern reaches a likelihood to warrant a further plurality of communication nodes.

In an embodiment, finite and known travel speeds configured using machine learning enable nodes cycle times to be turned down/reduced. For example, the system is configured using ML and AI to provide better path prediction and greater certainty of future paths whereby nodes and sensors that are not likely to be in a determined path are turned off or cycled down for longer periods of time, thusly saving power and battery life.

In one embodiment, the plurality of communication nodes and the plurality of sensor nodes 600 is powered up and utilized to trigger power-up of a node processor integrated inside each of the nodes from sleep cycles. In addition, sensors, like node processors, are configured to also be fully powered down for periods of time, while sensors on another node 100 in a region or area are kept active. In an aspect, sensors such as a PIR sensor 110 may remain active and powered even when node processors may be powered down such as during a sleep cycle. In this regard, the sensor itself, on the PCB (with the Node processor), would also have a sleep cycle controlled by the node processor.

In an embodiment, the system 1100 is configured to designate a fraction of the nodes of the plurality of sensor nodes 600 to cycle on periodically while most other of the nodes of the plurality of sensor nodes 600 in the region (and/or their sensors) may be fully powered off. In an example, the system and/or node(s) determines when vibrations associated with rain, for example, has ended, indicating that a particular weather-related noise has ceased and the plurality of sensor nodes 600 may then be configured to resume normal cycle times.

In yet another embodiment, sensor thresholds are configured to be adjusted during weather-triggered noise, such that when sensors might otherwise be cycled to be on, they would trigger less (and thusly less frequently trigger processor power-ups) based on such weather-related noise. In an exemplary aspect, nodes and sensors might be more densely placed near outside perimeters of areas being monitored as obviously those outer-most regions represent the first "trip-wire' to then activate other interior zones, including nodes and sensors, to become active. Further, sensor thresholds are configured to maintain a balanced cycle of wake/sleep states wherein sensor thresholds generally are configured to reduce wake cycle time and increase sleep cycle times until a potential threat probability assessment is escalated for any particular node(s) in question.

In yet another embodiment, the distributed plurality of nodes 600 provides a unique design and approach that does not seek to, nor relies on making a determination or assessment of a target based on a single or group(s) of higher resolution images (e.g., high-resolution camera or sensor images). Rather the system 1100 is configured to utilize short-range and low-data sensors (especially binary sensors and sensor triggers) using them to identify the time series of such data across both nodes and time. Likewise, the system 1100 is configured to gather binary and low data (more so scaler data) from the PIR sensor 1108 rather than high-resolution/high-data, wherein the time series patterns utilize far less data and require lower computing power, and thus, less battery power.

In an embodiment, the system 1100 executes escalating probability assessments as targets proceed further or deeper into or across the mesh, encountering an increasing number of nodes and sensor types in order to fit a path or time series.

In one embodiment, the system 1100 is configured to use shorter range and binary PIR sensor 1108 to achieve a very low-cost system, and low-cost nodes. In this regard, the node 100 may be designed to achieve low cost due to its overall size. In an exemplary embodiment, the size of the node 100 is configured to be approximately of 1.5 cm in diameter. It is an object of the present invention that the smaller size of the node 100 enables it to blend in with the environment thereby avoiding easy detection, especially at night or other visibility impaired environments (e.g., rain, dust, vegetation etc.), wherein little to no infrared signature is apparent.

In one embodiment, each of the plurality of nodes 600 is integrated with Bluetooth low energy (BLE) or other similar types of communications In an embodiment, broadcasts of/from the BLE integrated with a node 100 is configured to allow the BLE signals from any number of nodes of the plurality of nodes 600 to reach the BLE integrated to any number of the other nodes comprising the plurality of nodes 600. It is therefore an object of the present invention that communication between the plurality of nodes 600 is difficult to intercept. Advantageously, by using low-power BLE (or similar short distance protocols), systems and devices of the present invention avoid interception as most adversaries do not search for such low power BLE, and further carry their own BLE signature devices thereby making identifying other BLE signatures more challenging amid their own "BLE noise" or footprint.

It is also an object of the present invention to provide durability, saturation, and redundancy which enables on/off cycling of nodes. In an exemplary aspect, nodes may be in sleep cycle 90% to over 99% of the time. It is a further object that no single node or group of nodes renders the system non-operational, whether damaged, malfunctioning or jammed. Likewise, the system is "self-healing" in the sense that no node 100 is itself essential to assessing increasing probabilities that sensor data reflects an actual incursion, and also that communications do not rely on set paths of communications, nor field assessments/analysis.

In one embodiment, the system 900 is configured such that the direct attack, collection or damage of a node 100 may only impact that specific node 100, and any malfunction or disrupted communications from node 100 is readily be learned, as the node 100 is configured to be self-checking and includes means for reporting its/their status periodically. In an exemplary aspect, the direct contact (e.g., picking up) of node 100 is detectable using means such as embedded accelerometers, wherein the exact position of such node(s) is visible within the grid. In a further aspect, with respect to sensor readings, communications, etc. each of the node 100 is interchangeable, wherein damaged/missing/malfunctioning nodes need not be replaced.

In yet another embodiment, the system 900 is configured to determine the location of a node 100 that is unable to report its current status due to jamming. In an alternative aspect, it is an object of the present invention to provide a distributed system, wherein sensors configured on thousands of plurality of nodes 600 separated by shorter distances, and requiring shorter distance communications, are more difficult to jam than, for example, larger sensor towers that cover orders of magnitude more area, and provide a target to concentrate jamming. It is a further object of the present invention to provide a distributed system that, by its nature, is more difficult to jam, thereby allowing an area being jammed to be visible.

In an embodiment, the system 900 is configured to consume the least amount of power by managing the sleep cycle of the plurality of communication nodes and the plurality of sensor nodes 600, respectively. In an exemplary aspect, most of the plurality of communication nodes and plurality of sensor nodes 600 are in sleep cycle the vast majority of time. Sleep cycles are reflective of the location of the node 100 relative to the outermost perimeter where threats would generally arrive and would first incur/breach the grid thereby triggering sensor activity. For example, if the grid were 100 yards wide along a particular perimeter, it could safely be assumed that most foot traffic crossing such grid might take 30 seconds or longer to traverse the 100-yard-wide grid from the outer border to the interior portion of that grid. Thus, those nodes furthest from the incursion point could ALL be safely put into sleep mode for at least 30 seconds longer than nodes nearest to the outermost incursion point. As discussed, because sensor (e.g., PIR) range is greater than the distance between the nodes, not all Nodes and sensors need to be active at all times, so the majority can be put into sleep cycles. Where intrusions originate from a single direction (or outer perimeter) nodes further from the perimeter can be put into longer sleep cycles. For example, if an intruder might take 30 seconds to walk 100 yards, then nodes 100 further from the outer most perimeter need not have any nodes active for 30 seconds, enabling longer sleep cycles and conserving power.

Further, for example, if a user arbitrarily defines a small space that comprises 100 square yards and contains 100 Nodes, said small space may be configured so that at least 4 Nodes (distributed evenly across that 100 square yards) is active at least once per second. Each node 100 may, for instance, cycle powered on once every 25 seconds on average, though the cycle time might be under a second dictated by sensor and processor power up times. However, with assumed travel speeds, cycle times on node 100 further away from the outer-most perimeter might be set even less frequently to cycle power on. Similarly, for example, it might be assumed that incursions might not occur sooner than 30 seconds from first detection of possible incursions on the outer-most node 100, which generally acts as the system trip wire. Thus, cycle times for such node 100 for an interior node 100 may be adjusted and shortened, if and when potential incursions (based on sensor triggers) are detected by the outermost node 100. Thus, the outer-most node functions as a trip wire for the more interior portions of the grid, thereby signaling the interior portions of the grid to become more active until such time as the threat has passed or it is determined that the probability of threat is deemed lower or has passed. Thus nodes further from the perimeter may have less frequent cycle times (i.e., longer sleep cycles), or alternatively, for example the node 100 further from the outer-most perimeter may be deployed in lower densities while retaining comparable system monitoring with lower density nodes.

In an embodiment, cycle times are configured to be dynamic and based on threat level assessments (probabilities) so that most sensors, and more so processors, are preferably in a sleep cycle as much as 99% of the time or more. Power conservation extends further into mesh communications, whereby the communications design includes finding on average the lowest "power" path for communications of data, analysis and instructions (e.g., including cycle times) both between the plurality of communication nodes and plurality of sensor nodes 600 and between the plurality of communication nodes and the data center.

In an exemplary embodiment, in mesh communications each of the node 100 may be eligible for communications populating across the mesh, though for the current embodiment, as would be implied by sleep cycles, not all nodes might be awake and eligible for mesh communications at any one time by design. In addition, beyond sleep cycles, a further reduced subset of nodes is configured to be selected to participate in any particular communication based on their projected battery life.

In a further embodiment, after the accurate mapping described above, an additional layer of communications power conservation is configured to allow the broadcast power of each of the node 100 to be adjusted to (minimally) only reach the targeted node 100 (or nodes in the mesh communications path to enable communications, thereby significantly further reducing overall mesh power usage for communications (reducing both the number of node 100 involved in any particular communication and those nodes' individual broadcast power). In an exemplary aspect, communications power conservation is also used for intra-mesh analysis by nodes to assess probabilities of incursions based on local sensor data comparisons.

In yet another embodiment, the plurality of communication nodes (particularly for larger grids) is configured to hurdle-over regions and communicate over longer distances, such as to Communication Centers while avoiding all the nodes (and necessary battery power utilization/consumption) that would be engaged for communications to ripple through the mesh (i.e., transferring messages or information sensor node-to-sensor node). Specifically, hurdling would allow the plurality of communication nodes to pick up local communications from the plurality of sensor nodes and pass them on. In an exemplary aspect, in instances requiring, say, 100 yards or more for each next communication step, hurdling provides more efficient longer distance communications, thereby replacing the need for cellular uplinks in areas where there was no cellular coverage.

In an embodiment, for any communications path, the system is configured to continually and dynamically balance broadcast power level and number of nodes employed by analyzing battery levels, sleep cycles, and making assessment of the lowest power path through the mesh. In an exemplary aspect, said analysis includes assessing the state of uplinks or other grid management points.

As communication nodes might only comprise a small fraction of the overall nodes (e.g., 1 in 1000 or even 1 in 10,000) the cost of communication nodes (including the cost of replacing them over time if their battery lives were less than those of sensor nodes), would be less significant to the overall apparatus' or system's cost). In various embodiments, the apparatus or system may be comprised of communication nodes and/or sensor nodes. The communication nodes are configured to generally collect data and communications (e.g., messages) to/from sensor nodes. It is an object of the present invention that communication nodes are configured to collect data and communications in a more efficient manner rather than having such data and messages in the mesh communications flow being handed/transferred from node to node, and particularly in order to traverse said data and communications over long distances.

It is a further object of the present invention to conserve power usage. In an aspect, communications and data flow across a mesh could entail using many times (e.g., even thousands more) sensor nodes to relay messages across certain distances. Said use of sensor nodes, themselves having a small and finite battery capacity, would as compared to the use of communications nodes, involve the use of significantly more power in aggregate and thereby, for instance, shorten the grid's useful life. On the other hand, the higher-powered communication node processors are enabled to communicate large volumes of data more rapidly, including certain broad communications such as firmware updates or broad parameter settings for sensor node status instructions, etc. Furthermore, communications nodes may be configured to communicate with many nodes simultaneously in a substantially more efficient manner.

Even further, the communication nodes' higher powered processors can enable significantly greatly field analysis capabilities to assess the probability and nature of threats without requiring a conventional communications center capabilities. In this respect, the use of communication nodes reduces reliance on communications lines or other network connection methods to transfer data and communications to data centers, thereby enabling more rapid and real time assessment and instructions to operators managing incursions in the grid.

Yet further, in applications requiring clandestine operations, uplink communications to data centers may be visible to adversaries, potentially providing intelligence information to said adversaries regarding active operations. In an exemplary aspect, uplinks are easier to jam and/or disrupt versus using short range BLE communications directly to operators or agents in the grid. Those of skill in the art recognize that low energy/short distance communications are significantly more difficult to detect, especially given that such communications may be routed around or away from potential threats or adversaries. It is therefore an object of the present invention to provide the aforementioned two-tiered system (i.e., sensor nodes and communications nodes) as a more effective and efficient scheme for operation of larger grid applications.

Advantageously, despite sleep mode, the density of nodes enables the overall grid to still effectively monitor for activity given sensor ranges may be effective well beyond the next closest node. For instance, an exemplary grid/mesh is defined as a 20×20 foot square, consisting of approximately 50 nodes, wherein at any one time only one node's PIR sensor needs to be active at any one time in order to cover the entire region mesh (assuming a PIR range of roughly 10-12 feet). As such, approximately 98% of the nodes' sensors will be in sleep mode (fully powered down) at any one time. Processors would be in sleep cycle an even higher percentage of the time, as sensor activity above predetermined thresholds are configured to trigger power-ups of surrounding sensor nodes' microprocessors thereby enabling an increase in the number of active sensor nodes near, or in the path of a potential incursion. Said nodes are also enabled to assess or share sensor readings-first with local nodes, then more broadly if the probability that sensor data is deemed likely to be an incursion (versus weather or other noise). Thus, sensor node density (distance between nodes) is directly related to the overall grid's battery life, as generally the greater the density, the less frequently any one node or its sensors needs to be active/awake rather than in sleep cycle.

Of course, in combination, the relatively large PIR lens (as large as approx. 1" diameter) further improves PIR effectiveness in cases where the node comes to rest other than flat side down—in part the larger diameter of the domed top ensures that some facets are well off the ground by ½" or more making the PIR lens facets less likely to be blocked by imperfections in the ground surface, vegetation, etc.

In a further embodiment, the system 1100 is configured to identify and analyze weather related noise by looking for weather patterns across many nodes in a region or local area, thereby allowing sensor trigger thresholds to be tuned or adjusted to ignore certain noise patterns (e.g., wind, dust, rain, uneven clouds, etc.). As such, the system 1100 provides for a majority of nodes and sensors to be turned off for extended periods of time in such cases to avoid weather-related triggers.

It is an object of the present invention to configure the system, sensors, and nodes such that the amount of noise impacting each sensor node is a tiny fraction of the noise that would be experienced in conventional large sensor arrays. For example, a thermal camera seeking a target a mile away in a rainstorm might at any one time, encounter dozens or hundreds (or more) raindrops that could largely or fully obscure a heat signature (or heat differential vs ambient background). The distance between nodes is orders of magnitudes less, so the heat signature of an intruder is much larger, and covering an equally larger range of field. So using the example of rain drop interference, there might be only a few raindrops (or even 100) between the PIR and the intruder, yet still obscuring/covering only a portion of the heat signature. In contrast for example, with long range sensors, one raindrop might cover the entire heat signature of a human, and there might be hundreds or thousands of raindrops covering that signature at any one time In contrast the same rain storm might only lead to several raindrops for a much larger (and greater field of range) sensor target for PIR, that would be present at any one time between a person in the grid and any particular close-proximity PIR sensor located on each of the Nodes nearest to such target incursion (i.e., under 10 feet or even 1-2 feet, where essentially the signal-to-noise ratio is still very high). So, the weather-related noise can be measured and assessed by thousands of nodes locally to ID the noise and ignore such signals, to avoid processor power up cycles from patterns that fit current noise profiles in the field.

In another embodiment, by reference to FIGS. 6A-6C and FIG. 11, the system is configured to monitor waterways. In an exemplary embodiment, nodes would be constructed to be waterproof (and potentially designed to survive pressure for deeper underwater deployments). Further, the nodes may be scattered on the surface of waterways for temporary monitoring, or transmission with tides and currents. In a further embodiment, nodes are strung together and connected comprising a line of nodes via a wire or similar means, which both physically secures them together and also provide a wired means of communication between the nodes (though lower frequency and/or other communication methods utilized in underwater applications might be used as well). In an exemplary embodiment, the strings include a weight at the bottom of the string and floatation device at the top (though in some aspects nodes themselves would substitute in part or in full as a floatation device). Further, such strings of nodes may be permanently anchored to the bottom ground or other surface via their weight. Even further, nodes may be configured based on weight/density to hover above (i.e., not touch) and not anchor to the bottom ground or surface, instead floating with the currents or tides.

In yet a further embodiment, nodes in an exemplary monitoring system could be deployed in unmapped locations (e.g., indoor spaces, corridors, rooms, tunnels, caves, etc.) and especially in GPS-denied environments, wherein nodes and sensors of the exemplary monitoring system simultaneously navigate and map an unknown floorplan or space by gathering navigational information using gyroscopes, accelerometers and other sensors and techniques to create a floor plan or map when nodes are deposited along such path.

Drones, vehicles, or humans could be deployed with self-mapping capabilities (using GPS, or in GPS-denied environments with accelerometers and other tools) while creating 2D or 3D floor plan in combination with navigational markers) of caves, tunnels, buildings, ships etc. so, as the drone or operator navigates, nodes would deployed concurrently the system creates a floor plan or 3D map (i.e., in building or ship with more than one floor or level) in real time, or within potentially minutes, while the deposited Nodes provide both markers and sensors to enable both monitoring with the newly-created floor plan or map, and enable navigating within the mapped regions (corridors, rooms, caves, tunnels, etc.).

Nodes within and along the space to monitor the space for activity that could be viewed on the newly-created map of the space. Then, using the intra-Node communications to be relay mapping information even during flight (or other means of transport), using the Nodes to transmit the information back to various types of centralized monitoring or processing, such as laptops or with uplinks to data centers for possibly faster and higher powered processing. Further, as is generally the case with a deployed grid, beacons or tags could be worn by team members (or identified by smart phones or other device) to readily identify team members versus others that might trigger sensor activity, and also so the Communications Centers can identify both "friend" versus "unknowns" (or "foe") readily, including via handheld phones or other devices carried by operators in the local environment.

Such a system with Nodes and drone (or other device) the system can even enable manual navigation of drone where it might otherwise be deep into a cave, tunnel or corridors and be out of signal range. And, thus can map unknown spaces in real time ahead of operators following the drone to know in advance if there is any activity near the drone or anywhere the drone has traveled. Additional components could be incorporated onto Nodes, such a compass or tip sensor to determine direction of partial PIR range if it lands upside down. For the sake of clarity, the exemplary Nodes are not sensors as described in the prior art. LEDs, buzzers, speakers, smoke generators are all additional tools offering unique capabilities of such a sensor grid, that can be used for both locating targets in the grid, and/or useful distractions that can reduce interdiction risk, or risks to combatants.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted.

The description of the present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. An apparatus for detecting intruders through a secure perimeter, the apparatus comprising:

- one or more nodes consisting of one or more sensor nodes, or said one or more sensor nodes coupled with one or more communications nodes, arranged in a suitable configuration, wherein the apparatus comprises:
- one or more sensor nodes, said nodes consisting of a processor and a plurality of sensors including, at least, a sensor to detect vibrations and a faceted passive infrared (PIR) sensor lens configured on a dome-shaped portion to gather and direct light reaching said dome-shaped portion to the PIR sensor;
- one or more communications nodes consisting of a processor; wherein the sensor nodes and the communications nodes includes:
  - a generally flat portion incorporating a coin cell and a circuitry arrangement;
  - a second portion comprising a dome configured on and sealed along a periphery of the flat portion to prevent humidity from penetrating inside the circuitry arrangement; and
- a wire antenna tail configured to absorb impact energy and to increase a probability that the nodes come to rest flat side down when the nodes contact a ground or other surface after being deployed.

2. The nodes of claim 1, wherein the node is configured for aerial deployment, including being light in weight, impact resistant, and having a diameter in the range of 1-2".

3. The apparatus of claim 1, wherein the one or more sensor nodes includes BLE or other low power processor.

4. The apparatus of claim 1, wherein a number of the one or more communications nodes is fewer than the one or more sensor nodes.

5. The apparatus of claim 1, wherein the apparatus is configured with one or more sensor nodes and one or more low-power, short-range communication nodes.

6. The sensor nodes of claim 5, wherein said sensor nodes are configured to collect data perform preliminary analysis of said data, and communicate the data and preliminary analysis to communication nodes.

7. The apparatus of claim 1, wherein the one or more communication nodes are configured with short-range communications, including BLE, for communicating with sensor nodes, and long-range, higher powered processors and communications, including LoRa, Zigby, WiFi, and Cellular, for communicating with sensors and providing greater and more complex analysis computing capacity, data storage and transfer speeds.

8. The communications nodes of claim 7, wherein said communication nodes include higher level processors configured to efficiently gather, analyze and relay more data over longer distances.

9. The apparatus of claim 1, wherein the sensor nodes are configured to, when on the ground and facing up, to reliably detect human shadow and vibration.

10. The apparatus of claim 1, wherein the sensor nodes are configured for increased efficiency by using low-power, low-bandwidth, and minimal data, short-range sensors and binary sensor data fitting a time series of an incursion path.

11. The apparatus of claim 1, wherein the nodes are configured with one or more light emitting diodes (LEDs) and a buzzer for providing notification of intrusions.

12. The nodes of claim 11, wherein the nodes are configured to provide, individually or collectively using sequences and patterns across said nodes, visual and audio navigation of a path by using the one or more LEDs and the one or more buzzers; and wherein said nodes are configured to indicate directions and paths of intruders while providing visual and audio target location clues.

13. The apparatus of claim 1, configured to provide texting communications (comprising at least one of text messages, images, notifications, alerts, reminders and updates, between operators using smart devices (comprising at least one of smartphones, tablets, and other mobile devices connected to a grid, using only sensor nodes and/or communications nodes as a means for relaying communications between said smart devices.

14. The apparatus of claim 1, wherein the nodes, initially mapped with global positioning system (GPS) coordinates, is permanently configured with said GPS coordinates to provide accurate navigation of the plurality of nodes without future need or reliance on GPS system.

15. The apparatus of claim 1, wherein one or more nodes is configured to provide real time targeting and targeting updates for navigating weapons and plotting target interception, location, and path.

16. The apparatus of claim 1, wherein the nodes are constructed with a D-shaped case configured to aid the nodes in landing and remaining in an upright position.

17. A method of securing a perimeter, including deploying, mapping, and extracting data from nodes, the method comprising the steps of:

determining a real-time location of a deployment vehicle and sending to and storing thereon said real-time location to the nodes;

updating and replacing the real-time location with an updated real-time location thereon the nodes;

deploying one or more nodes, consisting of one or more sensor nodes, or said one or more sensor nodes coupled with one or more communications nodes, over an assigned location using the deployment vehicle;

ceasing updating of real-time location during the deployment of nodes;

collecting deployment order and sequence data of the nodes;

comparing the assigned location with the updated real-time location for each of the nodes to validate location, deployment order and sequence data of the nodes;

mapping each of the nodes with a real-world map;

fetching a real-time location of the nodes and transmitting the fetched location to a data center;

creating a map of the nodes with their original locations;

dividing the map into a grid assigned with the real-time location of the nodes;

establishing grid coordinates by receiving signals broadcasted from the communication nodes;

fetching sensor data, including passive infrared and vibration data, corresponding to an intruder;

identifying sensor data, including passive infrared and vibration data, associated with the intruder;

generating an interdict signal based on the identification of the spectral signatures associated with the intruder; and reporting the interdict transmission signal via a data center to control or disrupt the intruder near, at, or through a perimeter.

18. A system for identifying intruders over a secure perimeter, the system comprising:

an apparatus comprising:

one or more nodes consisting of one or more sensor nodes, or said one or more sensor nodes coupled with one or more communications nodes, arranged in a suitable configuration wherein the apparatus comprises:

one or more sensor nodes, said nodes consisting of a processor and a plurality of sensors including, at least, a sensor to detect vibrations and a faceted passive infrared (PIR) sensor lens configured on a dome-shaped portion to gather and direct light reaching said dome-shaped portion to the PIR sensor, and one or more communications nodes consisting of a processor; wherein the sensor nodes and the communications nodes includes:

a generally flat portion incorporating a coin cell and a circuitry arrangement;

a second portion comprising a dome configured on and sealed along a periphery of the flat portion to prevent humidity from penetrating inside the circuitry arrangement;

a wire antenna tail configured to absorb impact energy and to increase a probability that the nodes come to rest flat side down when the nodes contact a ground or other surface after being deployed;

a data center communicatively linked to the communication nodes of the apparatus via a network interface to receive data from the nodes;

a processing module linked to the data center, configured to process and generate one or more results from the received data using an artificial intelligence and machine learning (AI/ML) module; and one or more computing devices communicatively linked to the data center via the network interface, wherein the one or more computing devices receives one or more notifications based on the one or more results related to intruders detected by the sensor nodes.

* * * * *